(12) United States Patent
Steinhardt et al.

(10) Patent No.: US 7,316,832 B2
(45) Date of Patent: Jan. 8, 2008

(54) ARTICLES AND METHODS FOR APPLYING COLOR ON SURFACES

(75) Inventors: Mark John Steinhardt, Cincinnati, OH (US); Shawn Christopher Pallotta, Maineville, OH (US); Robert Lawrence Prosise, Cincinnati, OH (US); John William Toussant, West Chester, OH (US); Andrew Julian Wnuk, Wyoming, OH (US); Von Adoniram Kinsey, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/436,027

(22) Filed: May 12, 2003

(65) Prior Publication Data

US 2004/0076788 A1   Apr. 22, 2004

Related U.S. Application Data

(60) Provisional application No. 60/380,224, filed on May 13, 2002, provisional application No. 60/380,225, filed on May 13, 2002, provisional application No. 60/380,205, filed on May 13, 2002, provisional application No. 60/343,146, filed on Dec. 20, 2001.

(51) Int. Cl.
*B32B 29/00* (2006.01)
*B32B 33/00* (2006.01)

(52) U.S. Cl. .................. 428/33; 428/41.6; 428/192; 428/194; 428/201; 428/202; 428/904.4

(58) Field of Classification Search .............. 428/40.1, 428/40.2, 41.2, 41.6, 33, 88, 192, 194, 195.1, 428/201, 202, 904.4, 914
See application file for complete search history.

(56) References Cited

U.S. PATENT DOCUMENTS 1,365,715 A   1/1921   Morrison (Continued)

FOREIGN PATENT DOCUMENTS

DE   22 54 430   3/1974

(Continued)

OTHER PUBLICATIONS

U.S. Appl. No. 11/393,506, filed Mar. 30, 2006, Kinsey et al.

(Continued)

*Primary Examiner*—Jennifer McNeil
*Assistant Examiner*—Timothy M. Speer
(74) *Attorney, Agent, or Firm*—Larry L. Huston; Jeffrey V. Bamber; Leonard W. Lewis

(57) ABSTRACT

Articles for applying color on a surface that includes a sheet of dry color component having a margin, a front sheet surface, and a rear sheet surface opposite the front sheet surface, and an adhesive on the rear sheet surface for bonding the sheet to the surface. Either the margin of the sheet or the entire sheet is adapted for reducing or eliminating the visual perceptibility of the seam created when the margin is positioned in an overlapping, abutting, or spaced apart relationship with a margin of a juxtaposed second article. The reduction or elimination of the visual perceptibility of the seam may be promoted by a physical mechanism, a chemical mechanism, an optical mechanism, or a combination of these mechanisms.

4 Claims, 4 Drawing Sheets

U.S. PATENT DOCUMENTS

| | | |
|---|---|---|
| 2,746,893 A | 5/1956 | Matthes |
| 2,804,700 A | 9/1957 | Holtkamp |
| 3,152,030 A | 10/1964 | Sampson |
| 3,301,741 A | 1/1967 | Henrickson et al. |
| 3,314,838 A | 4/1967 | Erwin |
| 3,331,729 A | 7/1967 | Danielson et al. |
| 3,616,192 A | 10/1971 | Sinclair |
| 3,640,791 A | 2/1972 | Rosenheim |
| 3,654,044 A | 4/1972 | Hirota |
| 3,666,516 A | 5/1972 | Dunning |
| 3,671,236 A | 6/1972 | Van Beusekom |
| 3,741,786 A | 6/1973 | Torrey |
| 3,743,086 A | 7/1973 | Aldrich |
| 3,896,249 A | 7/1975 | Keeling et al. |
| 3,900,644 A | 8/1975 | Sackoff et al. |
| 3,900,645 A | 8/1975 | Morgan |
| 3,916,046 A | 10/1975 | Youngberg |
| 3,933,702 A | 1/1976 | Caimi et al. |
| 4,037,008 A | 7/1977 | Tugwell |
| 4,054,697 A * | 10/1977 | Reed et al. ................. 428/41.8 |
| 4,068,033 A | 1/1978 | Meade |
| 4,094,690 A | 6/1978 | Morton |
| 4,151,319 A | 4/1979 | Sackoff et al. |
| 4,175,156 A | 11/1979 | Ikins |
| 4,205,107 A | 5/1980 | Jaschke et al. |
| 4,210,485 A | 7/1980 | Lake |
| 4,232,077 A | 11/1980 | Meisel |
| 4,235,657 A | 11/1980 | Greenman et al. |
| 4,241,129 A | 12/1980 | Marton et al. |
| 4,248,762 A | 2/1981 | Hornibrook et al. |
| 4,248,917 A | 2/1981 | Hornibrook et al. |
| 4,256,794 A | 3/1981 | Meisel |
| 4,258,096 A | 3/1981 | LaMarche |
| 4,262,051 A | 4/1981 | Welz et al. |
| 4,298,647 A | 11/1981 | Cancio et al. |
| 4,369,157 A | 1/1983 | Conner |
| 4,376,151 A | 3/1983 | Parrotta |
| 4,376,159 A | 3/1983 | Spechler |
| 4,377,050 A | 3/1983 | Renholts |
| 4,451,522 A | 5/1984 | de Vroon |
| 4,499,130 A | 2/1985 | Questel et al. |
| 4,514,457 A | 4/1985 | Sasaki |
| 4,517,044 A | 5/1985 | Arnold |
| 4,524,097 A | 6/1985 | Graham |
| 4,550,683 A | 11/1985 | Jones |
| 4,555,441 A | 11/1985 | Rothenberg |
| 4,555,471 A | 11/1985 | Barzynski et al. |
| 4,556,595 A | 12/1985 | Ochi |
| 4,560,587 A | 12/1985 | Sasaki |
| 4,564,406 A | 1/1986 | Binks |
| 4,598,020 A | 7/1986 | Panush |
| 4,650,704 A | 3/1987 | Rothenberg |
| 4,661,182 A | 4/1987 | Lerner |
| 4,737,225 A | 4/1988 | Waugh et al. |
| 4,759,441 A | 7/1988 | Leurck |
| 4,783,354 A | 11/1988 | Fagan |
| 4,786,537 A | 11/1988 | Sasaki |
| 4,818,589 A | 4/1989 | Johnson et al. |
| 4,854,610 A | 8/1989 | Kwiatek |
| 4,871,618 A | 10/1989 | Kinneberg et al. |
| 4,888,244 A | 12/1989 | Masubuchi et al. |
| 4,894,274 A | 1/1990 | Graham et al. |
| 4,902,557 A | 2/1990 | Rohrbacher |
| 4,919,994 A | 4/1990 | Incremona et al. |
| 4,999,076 A | 3/1991 | Incremona et al. |
| 5,000,810 A | 3/1991 | Silverstein |
| 5,034,269 A | 7/1991 | Wheeler |
| 5,045,569 A | 9/1991 | Delgado |
| 5,073,422 A | 12/1991 | Blackwell |
| 5,073,457 A | 12/1991 | Blackwell |
| 5,075,149 A | 12/1991 | Owens et al. |
| 5,084,317 A | 1/1992 | Epple |
| 5,114,514 A | 5/1992 | Landis |
| 5,134,012 A | 7/1992 | Arakawa et al. |
| 5,135,798 A | 8/1992 | Muschter et al. |
| 5,141,584 A | 8/1992 | Schuh et al. |
| 5,141,790 A | 8/1992 | Calhoun et al. |
| 5,169,474 A | 12/1992 | Binder |
| 5,183,696 A | 2/1993 | Sanderson |
| 5,192,612 A | 3/1993 | Otter et al. |
| 5,196,246 A | 3/1993 | Kauss et al. |
| 5,198,301 A | 3/1993 | Hager et al. |
| 5,203,941 A | 4/1993 | Spain et al. |
| 5,215,826 A | 6/1993 | Shimanski et al. |
| 5,229,207 A | 7/1993 | Paquette et al. |
| 5,250,336 A | 10/1993 | Greuse et al. |
| 5,266,372 A | 11/1993 | Arakawa et al. |
| 5,308,694 A | 5/1994 | Andersson |
| 5,316,843 A | 5/1994 | Kiryu et al. |
| 5,322,708 A | 6/1994 | Eissele |
| 5,342,666 A | 8/1994 | Ellison et al. |
| 5,346,766 A | 9/1994 | Otter et al. |
| 5,413,829 A * | 5/1995 | Brown et al. ............... 428/40.6 |
| 5,430,904 A | 7/1995 | Ono et al. |
| 5,441,784 A | 8/1995 | Smith |
| 5,451,440 A | 9/1995 | Tynan, Jr. |
| 5,460,855 A | 10/1995 | Andersson |
| 5,468,532 A | 11/1995 | Ho et al. |
| 5,476,901 A | 12/1995 | Smith et al. |
| 5,482,182 A | 1/1996 | Thompson et al. |
| 5,487,929 A | 1/1996 | Rusincovitch, Jr. et al. |
| 5,489,359 A | 2/1996 | Yamane |
| 5,490,893 A | 2/1996 | Enlow et al. |
| 5,498,305 A | 3/1996 | Mailloux |
| 5,506,031 A | 4/1996 | Spain et al. |
| 5,518,786 A | 5/1996 | Johnson et al. |
| 5,523,129 A | 6/1996 | McGeehan-Hatch |
| 5,571,557 A | 11/1996 | De Bastiani et al. |
| 5,573,865 A | 11/1996 | Steelman et al. |
| 5,591,290 A | 1/1997 | Walter et al. |
| 5,591,513 A | 1/1997 | Walter et al. |
| 5,595,626 A | 1/1997 | Yokouchi et al. |
| 5,620,772 A | 4/1997 | Taniguchi |
| 5,633,078 A | 5/1997 | Kamiyama |
| 5,633,225 A | 5/1997 | Fredj et al. |
| 5,639,539 A | 6/1997 | DeProspero et al. |
| 5,641,835 A | 6/1997 | Smith et al. |
| 5,643,668 A | 7/1997 | Calhoun et al. |
| 5,658,646 A | 8/1997 | Takano et al. |
| 5,662,977 A | 9/1997 | Spain et al. |
| 5,665,458 A | 9/1997 | Mahn, Jr. |
| 5,670,014 A | 9/1997 | Mendelovich et al. |
| 5,676,787 A | 10/1997 | Rusincovitch et al. |
| 5,681,631 A | 10/1997 | Steelman et al. |
| 5,683,805 A | 11/1997 | Oita et al. |
| 5,707,482 A | 1/1998 | Fusselman |
| 5,707,697 A | 1/1998 | Spain et al. |
| 5,725,712 A | 3/1998 | Spain et al. |
| 5,728,469 A | 3/1998 | Mann et al. |
| 5,741,620 A | 4/1998 | Holmes et al. |
| 5,750,234 A | 5/1998 | Johnson et al. |
| 5,750,254 A | 5/1998 | Starkey |
| 5,773,112 A | 6/1998 | Tachikawa et al. |
| 5,785,790 A | 7/1998 | Olsen et al. |
| 5,788,796 A | 8/1998 | Look et al. |
| 5,795,636 A | 8/1998 | Keller et al. |
| 5,814,402 A | 9/1998 | Smith |
| 5,851,931 A | 12/1998 | DeRenzo et al. |
| 5,852,121 A | 12/1998 | Steelman et al. |
| 5,853,876 A | 12/1998 | Takano et al. |
| 5,866,220 A | 2/1999 | Rusincovitch et al. |
| 5,891,294 A | 4/1999 | Shih et al. |
| 5,897,742 A | 4/1999 | Semmler |
| 5,904,968 A | 5/1999 | Langan |

| Patent No. | Date | Name |
|---|---|---|
| 5,906,883 A | 5/1999 | Blanc-Brude |
| 5,916,643 A | 6/1999 | Spain et al. |
| 5,919,537 A | 7/1999 | Niazy |
| 5,939,479 A | 8/1999 | Reaves et al. |
| 5,985,079 A | 11/1999 | Ellison |
| 5,989,707 A | 11/1999 | Takizawa et al. |
| 6,020,062 A | 2/2000 | Questel et al. |
| 6,042,678 A | 3/2000 | Johnson |
| 6,083,616 A | 7/2000 | Dressler |
| 6,086,995 A | 7/2000 | Smith |
| 6,096,396 A | 8/2000 | Patton et al. |
| 6,129,965 A | 10/2000 | Langan |
| 6,153,283 A * | 11/2000 | Pierson et al. ............... 428/141 |
| 6,193,918 B1 | 2/2001 | McGuire et al. |
| 6,194,064 B1 | 2/2001 | Keely et al. |
| 6,214,453 B1 | 4/2001 | Kano |
| 6,214,485 B1 | 4/2001 | Barnett et al. |
| 6,221,198 B1 | 4/2001 | Gryska et al. |
| 6,221,485 B1 | 4/2001 | Sanchez et al. |
| 6,228,486 B1 | 5/2001 | Kittel et al. |
| 6,235,363 B1 | 5/2001 | Bilodeau |
| 6,248,427 B1 | 6/2001 | Ast |
| 6,296,732 B1 | 10/2001 | Enlow et al. |
| 6,311,399 B1 | 11/2001 | Steelman et al. |
| 6,312,777 B1 | 11/2001 | Smith |
| 6,322,874 B1 | 11/2001 | Steelman et al. |
| 6,324,811 B1 | 12/2001 | Gauss et al. |
| 6,336,988 B1 | 1/2002 | Enlow et al. |
| 6,349,754 B1 | 2/2002 | Johnson |
| 6,352,769 B1 | 3/2002 | Mori |
| 6,364,992 B1 | 4/2002 | Nambu et al. |
| 6,376,058 B1 | 4/2002 | Schut et al. |
| 6,379,791 B1 | 4/2002 | Cernohous et al. |
| 6,383,613 B1 | 5/2002 | Takeda |
| 6,394,165 B1 | 5/2002 | Rader |
| 6,399,193 B1 | 6/2002 | Ellison |
| 6,413,630 B1 | 7/2002 | Nakayama |
| 6,421,052 B1 | 7/2002 | McGuire |
| 6,432,241 B1 | 8/2002 | Congard et al. |
| 6,432,528 B1 | 8/2002 | Faust et al. |
| 6,447,630 B1 | 9/2002 | Disano et al. |
| 6,461,422 B1 | 10/2002 | Yang et al. |
| 6,474,389 B1 | 11/2002 | Steelman et al. |
| 6,475,616 B1 | 11/2002 | Dietz et al. |
| 6,482,488 B1 | 11/2002 | Janssen et al. |
| 6,482,638 B1 | 11/2002 | Patil et al. |
| 6,493,918 B1 | 12/2002 | Bell et al. |
| 6,509,075 B1 | 1/2003 | McCurry et al. |
| 6,514,624 B2 | 2/2003 | Takemoto |
| 6,520,234 B1 | 2/2003 | Anderson et al. |
| 6,541,109 B1 | 4/2003 | Kumar et al. |
| 6,554,044 B2 | 4/2003 | Paulson et al. |
| 6,576,327 B1 | 6/2003 | Weissmann et al. |
| 6,579,601 B2 | 6/2003 | Kollaja et al. |
| 6,613,181 B2 | 9/2003 | Steelman et al. |
| 6,613,411 B2 | 9/2003 | Kollaja et al. |
| 6,617,008 B1 | 9/2003 | Kono et al. |
| 6,630,049 B2 | 10/2003 | Hannington et al. |
| 6,645,328 B2 | 11/2003 | Anderson et al. |
| 6,649,003 B1 | 11/2003 | Spain et al. |
| 6,649,682 B1 | 11/2003 | Breton et al. |
| 6,703,089 B2 | 3/2004 | DeProspero |
| 6,706,131 B2 | 3/2004 | Steelman et al. |
| 6,709,723 B2 | 3/2004 | Roys et al. |
| 6,723,427 B1 | 4/2004 | Johnson et al. |
| 6,740,379 B1 | 5/2004 | Congard et al. |
| 6,756,095 B2 | 6/2004 | Sandt et al. |
| 6,773,653 B2 | 8/2004 | Miller et al. |
| 6,783,816 B2 | 8/2004 | Golub et al. |
| 6,805,048 B2 | 10/2004 | Pearson et al. |
| 6,808,586 B1 | 10/2004 | Steinhardt |
| 6,824,638 B1 | 11/2004 | Anderson et al. |
| 6,866,383 B2 | 3/2005 | Naik et al. |
| 6,872,268 B2 | 3/2005 | David et al. |
| 6,875,800 B2 | 4/2005 | Vanier et al. |
| 6,916,532 B2 | 7/2005 | Yanagiuchi |
| 6,929,846 B2 | 8/2005 | Kamiyama |
| 6,955,124 B2 | 10/2005 | Ciaramitaro et al. |
| 6,984,429 B2 | 1/2006 | Thunhorst et al. |
| 7,141,133 B2 | 11/2006 | Kesti et al. |
| 2001/0006714 A1 | 7/2001 | Bull et al. |
| 2002/0127361 A1 | 9/2002 | Sandt et al. |
| 2002/0142155 A1 | 10/2002 | Steinberg |
| 2002/0182955 A1 | 12/2002 | Weglewski et al. |
| 2002/0197398 A1 | 12/2002 | Scholz et al. |
| 2003/0026932 A1 | 2/2003 | Johnson et al. |
| 2003/0116265 A1 | 6/2003 | Anderson et al. |
| 2003/0134114 A1 | 7/2003 | Pallotta et al. |
| 2003/0150547 A1 | 8/2003 | Kesti et al. |
| 2003/0157287 A1 | 8/2003 | Song |
| 2003/0211334 A1 | 11/2003 | Jones |
| 2004/0076788 A1 | 4/2004 | Steinhardt et al. |
| 2004/0101647 A1 | 5/2004 | Pitzen |
| 2004/0126529 A1 | 7/2004 | Squier et al. |
| 2004/0159969 A1 | 8/2004 | Truog et al. |
| 2004/0161564 A1 | 8/2004 | Truog et al. |
| 2004/0161566 A1 | 8/2004 | Truog et al. |
| 2004/0161567 A1 | 8/2004 | Truog et al. |
| 2004/0161568 A1 | 8/2004 | Truog et al. |
| 2004/0170855 A1 | 9/2004 | Kawabata |
| 2004/0200564 A1 | 10/2004 | Kinsey et al. |
| 2004/0247837 A1 | 12/2004 | Enlow et al. |
| 2004/0253421 A1 | 12/2004 | Truog et al. |
| 2004/0253422 A1 | 12/2004 | Truog et al. |
| 2004/0253423 A1 | 12/2004 | Truog et al. |
| 2005/0003129 A1 | 1/2005 | Truog et al. |
| 2005/0092420 A1 | 5/2005 | Kinne et al. |
| 2005/0175818 A1 | 8/2005 | Kawabata et al. |
| 2005/0196607 A1 | 9/2005 | Shih et al. |
| 2005/0255271 A1 | 11/2005 | Brimo |
| 2006/0003114 A1 | 1/2006 | Enlow et al. |
| 2006/0029765 A1 | 2/2006 | Truog et al. |
| 2006/0046027 A1 | 3/2006 | Kaminski et al. |
| 2006/0046028 A1 | 3/2006 | Kaminski et al. |
| 2006/0046083 A1 | 3/2006 | Steinhardt et al. |
| 2006/0051571 A1 | 3/2006 | Steinhardt et al. |
| 2006/0073318 A1 | 4/2006 | Tuttle et al. |
| 2006/0088695 A1 | 4/2006 | Coburn |
| 2006/0093776 A1 | 5/2006 | Crum |

FOREIGN PATENT DOCUMENTS

| | | |
|---|---|---|
| DE | 35 43 777 A1 | 6/1987 |
| DE | 197 35 958 A1 | 2/1999 |
| DE | 198 37 774 A1 | 2/2000 |
| EP | 0 032 258 A1 | 7/1981 |
| EP | 0 103 407 A1 | 6/1986 |
| EP | 0 216 230 A2 | 4/1987 |
| EP | 0 238 301 A1 | 9/1987 |
| EP | 0 103 344 B1 | 10/1988 |
| EP | 0 395 814 A2 | 11/1990 |
| EP | 0 233 633 B1 | 12/1991 |
| EP | 0 480 892 A1 | 4/1992 |
| EP | 0 266 224 B1 | 3/1993 |
| EP | 0 561 086 A1 | 9/1993 |
| EP | 0 384 252 B1 | 8/1994 |
| EP | 0 623 477 A2 | 11/1994 |
| EP | 0 487 724 B1 | 9/1995 |
| EP | 0 695 629 A2 | 2/1996 |
| EP | 0 381 349 B1 | 7/1996 |
| EP | 0 473 254 B1 | 8/1996 |
| EP | 0 803 351 A1 | 10/1997 |
| EP | 0 619 184 B1 | 7/1998 |
| EP | 0 658 175 B1 | 10/1998 |
| EP | 0 893 247 A1 | 1/1999 |
| EP | 0 638 019 B1 | 1/2000 |

| | | | |
|---|---|---|---|
| EP | 5 569 921 B1 | 1/2000 |
| EP | 0 578 957 B1 | 8/2000 |
| EP | 1 038 665 A1 | 9/2000 |
| EP | 1 093 911 A2 | 4/2001 |
| EP | 1 053 793 B1 | 3/2002 |
| EP | 1 201 422 A2 | 5/2002 |
| EP | 1 203 968 A1 | 5/2002 |
| EP | 1 047 556 B1 | 7/2002 |
| EP | 1 226 958 A1 | 7/2002 |
| EP | 1 055 514 B1 | 4/2003 |
| EP | 0 752 498 B1 | 6/2003 |
| EP | 1 169 180 B1 | 7/2003 |
| EP | 1 342 565 A1 | 9/2003 |
| EP | 1 023 169 B1 | 11/2003 |
| EP | 1 034 090 B1 | 12/2003 |
| EP | 0 993 876 B1 | 3/2004 |
| EP | 1 318 011 B1 | 9/2004 |
| EP | 1 462 423 A1 | 9/2004 |
| EP | 1 518 716 A1 | 3/2005 |
| EP | 1 377 646 B1 | 8/2005 |
| EP | 1 018 533 B1 | 12/2005 |
| GB | 1 232 971 | 5/1971 |
| JP | 49039997 A | 4/1974 |
| JP | 03-080557 A2 | 4/1991 |
| JP | 04-008785 A2 | 1/1992 |
| JP | 08/034959 A1 | 2/1996 |
| JP | 08-058033 A2 | 3/1996 |
| JP | 09-041617 A2 | 2/1997 |
| JP | 10/278187 A1 | 10/1998 |
| JP | 11-293123 A2 | 10/1999 |
| JP | 2001-227132 A2 | 8/2001 |
| JP | 2001-295425 A2 | 10/2001 |
| JP | 2001-310953 A2 | 11/2001 |
| JP | 2002-067243 A2 | 3/2002 |
| JP | 2002-113995 A2 | 4/2002 |
| JP | 2005-206724 A | 8/2005 |
| JP | 2005-220337 A | 8/2005 |
| WO | WO 90/00788 A1 | 1/1990 |
| WO | WO 92/13712 A1 | 8/1992 |
| WO | WO 94/03337 A2 | 2/1994 |
| WO | WO 94/09983 A1 | 5/1994 |
| WO | WO 95/17312 A1 | 6/1995 |
| WO | WO 99/19149 A1 | 4/1999 |
| WO | WO 99/37479 A1 | 7/1999 |
| WO | WO 99/64235 A1 | 12/1999 |
| WO | WO 00/01527 A1 | 1/2000 |
| WO | WO 00/50234 A1 | 8/2000 |
| WO | WO 00/56556 A1 | 9/2000 |
| WO | WO 01/00411 A1 | 1/2001 |
| WO | WO 01/79372 A2 | 10/2001 |
| WO | WO 03/053719 A2 | 7/2003 |
| WO | WO 03/062341 A2 | 7/2003 |
| WO | WO 03/066761 A2 | 8/2003 |
| WO | WO 03/095238 A1 | 11/2003 |
| WO | WO 2004/062903 A2 | 7/2004 |
| WO | WO 2004/074007 A2 | 9/2004 |
| WO | WO 2004/074008 A2 | 9/2004 |
| WO | WO 2005/007397 A1 | 1/2005 |
| WO | WO 2005/075591 A1 | 8/2005 |
| WO | WO 2005/105429 A1 | 11/2005 |

OTHER PUBLICATIONS

U.S. Appl. No. 60/778,832, filed Mar. 3, 2006, Steinhardt et al.
U.S. Appl. No. 60/779,191, filed Mar. 3, 2006, Westendorf et al.
U.S. Appl. No. 60/778,996, filed Mar. 3, 2006, Westendorf et al.
U.S. Appl. No. 11/413,543, filed Apr. 28, 2006, Westendorf et al.
Millikin & Company, "180 Walls", Jul. 18, 2006, Milliken & Company website www.180walls.com, home page, pages showing different patterns, and Frequently Asked Questions pages.
Nopar International, "Folio Contact: We stick to your ideas!", "Products—FolioContact—FAQ", "Data Sheet Folio Contact Gridded/Squared, imprinted for permanent markers and white for non-permanent markers", NOPAR International GmbH website, www.jet-contact.com, downloaded Mar. 19, 2007, NOPAR International GmbH, Bremen, Germany.
Fix-It Club, "How to Hang Wallpaper," http://home.howstuffworks.com, copyright 1998-2007, web pages printed Jan. 24, 2007, pp. 1-13, published on the internet by HowStuffWorks.com, c/o The Convex Group, Atlanta, GA, U.S.A.
Author Unknown, Avery Dennison™ "Find a Solution" Architectural film product information from website www.averydennison.com, copyright 1996-2007, web pages printed Feb. 6, 2007, Avery Dennison Corporation, Pasadena, CA U.S.A.
Author Unknown, Di-Noc™ Film Planning Guide, pp. 1-32, http://solutions.3m.com/wps/portal/3M/en_US/Graphics/Scotchprint/Solutions/Di-NocFilm/Bulletins/, date of publication unknown, Minnesota Mining and Manufacturing Company (3M), St. Paul, MN, U.S.A.
Author Unknown, Di-Noc™ Film Product Bulletin D1, pp. 1-5, http://solutions.3m.com/wps/portal/3M/en_US/Graphics/Scotchprint/Solutions/Di-NocFilm/Bulletins/, Aug. 2006, Minnesota Mining and Manufacturing Company (3M), St. Paul, MN, U.S.A.
Author Unknown, "Application of 3M™ Di-Noc™ Films, A Guide for Indoor and Outdoor Dry Applications, Instruction Bulletin 5.41", pp. 1-8, www.3m.com/intl/PH/downloads/Dinoc.pdf, Aug. 2006, Minnesota Mining and Manufacturing Company (3M), St. Paul, MN, U.S.A.
Author Unknown, "Instalacion de Di-Noc", pp. 1-27, http://www.pavimentosonline.com/3M/DINOC/index.htm, first date of publication unknown, downloaded Aug. 7, 2006, Minnesota Mining and Manufacturing Company (3M), St. Paul, MN, U.S.A.

* cited by examiner

ARTICLES AND METHODS FOR APPLYING COLOR ON SURFACES

CROSS REFERENCE TO RELATED APPLICATION

This application claims the benefit of U.S. Provisional Application No. 60/380,224, filed May 13, 2002 (P&G Case 8932P), and claims priority to U.S. application Ser. No. 10/324,237, filed Dec. 19, 2002 (P&G Case 8817M) and claiming the benefit of U.S. Provisional Applications No. 60/343,146 filed Dec. 20, 2001 (P&G Case 8817P), 60/380,225 filed May 13, 2002 (P&G Case 8817P2), and 60/380,205 filed May 13, 2002 (P&G Case 8817P3), and also claims priority to U.S. application Ser. No. 10/324,559, filed Dec. 13, 2002 (P&G Case 8817M2) and claiming the benefit of U.S. Provisional Applications No. 60/343,146 filed Dec. 20, 2001 (P&G Case 8817P), 60/380,225 filed May 13, 2002 (P&G Case 8817P2), and 60/380,205 filed May 13, 2002 (P&G Case 8817P3).

FIELD OF THE INVENTION

The present invention relates to articles and methods for applying color and, in particular, to articles and methods for applying a dry colorant to a surface.

BACKGROUND OF THE INVENTION

It is often desirable to apply one or more colors to a surface, for example an architectural surface such as an interior or exterior wall or the like, for aesthetic benefits and/or functional benefits such as water resistance. Color is typically provided by conventional painting with water-based or oil-based wet paints, application of wallpaper or the like. The laborious processes involved with wet painting and wall papering are well known. Typically, it is necessary to protect surrounding areas from collateral mess during such activities by taping adjacent surfaces where the color is not desired, arranging drop clothes to protect floors and furniture, and the like. Extreme care must also be exercised to avoid dripping of paint, wallpaper paste or primer, or other wet-applied materials. Many wet paint and wall paper products are also recommended for use together with one or more primers or bases to assist in coverage and/or durability of the desired color, thereby increasing the time and labor for producing a desired color effect on such a surface.

Additionally, it is typically necessary to saturate brushes, rollers or other applicators with paint, primer, paste or the like in order to apply the material to a surface. As a result, a significant amount of material is wasted, as it never reaches the intended surface, but remains on the applicator. Cleaning of brushes, sprayers, rollers and other tools used in application of wet paint and wall paper once painting or wall papering is completed, or at least suspended for a period of time, such as overnight, is also time consuming.

Many paints adapted for application to surfaces such as architectural surfaces include one or more volatile organic compounds. Such paints release noxious fumes during and after application, thereby requiring ventilation during and after application, particularly in closed environments such as buildings.

In structural surface covering operations that incorporate multiple strips or sheets of material, a seam is formed between each juxtaposed pair of strips. Seams provide imperfections that detract from the aesthetic appearance, or some other property, of the facade presented by the strips. Consequently, seam concealment is a significant concern in such structural surface covering operations. For example, the seams between adjacent dry wall panels are covered with drywall tape. With regard to covering operations that apply color to a surface, wallpaper is applied to interior walls by pasting multiple strips adjacent to each other. Wallpaper may be systematically applied to an interior wall by aligning a vertical edge of an initial strip with a plumb line drawn on the wall. At least one of the opposite vertical edges of the initial strip operates as a verticality guide for the application of subsequent strips of wallpaper. Adjacent ones of the strips are positioned in abutment so as to minimize the presence of gaps between juxtaposed margins or the occurrence of overlap. Typically, however, the vertical seams between adjacent pairs of strips are visibly perceptible. The visual presence of the vertical seams detracts from the aesthetic appearance of the color applied to the surface by the wallpaper.

Thus, in spite of the obvious aesthetic and/or functional benefits provided by applying color on a surface by conventional techniques such as wet painting or wall papering, the efforts required in connection with such procedures are inconvenient and time consuming and, moreover, the color applied to the surface may incorporate one or more seams that detract from the manifestation of the color effect to an observer.

SUMMARY OF THE INVENTION

The present invention is directed to an article for applying color on a surface that includes a sheet of dry colorant having a peripheral edge, a margin adjacent to the peripheral edge, a front sheet surface, a rear sheet surface opposite the front sheet surface, and an adhesive on the rear surface for bonding the sheet to the surface. The sheet has a thickness of less than 3.0 mils. In various embodiments of the invention, the margin of the sheet, or the entire sheet including the margin, is adapted to reduce the visual perceptibility of a seam created when two sheets are positioned with a juxtaposed relationship.

BRIEF DESCRIPTION OF THE DRAWINGS

Various advantages, objectives, and features of the invention will become more readily apparent to those of ordinary skill in the art upon review of the following detailed description of the preferred embodiments, taken in conjunction with the accompanying drawings.

DETAILED DESCRIPTION

Figure 1:
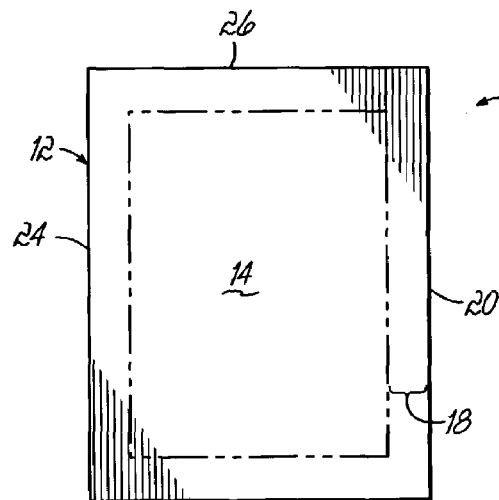
FIG. 1 is a diagrammatic top view of an article for applying color to a surface according to the present invention.

The present invention is directed to articles and methods for applying color on a surface. As employed herein, the term "color" is used to refer to a color effect, i.e., a difference in color or visual perception. In a specific embodiment, the color effect is a substantially permanent color effect, i.e., a color effect which is not removed upon casual contact, light washing, or the like. Thus, a substantially permanent color effect is distinguished from a temporary color effect which can be easily removed or reduced, such as that provided by chalk or crayons. The terms "colorant" and "color component" are used synonymously herein to refer to the component of the inventive articles, which provides the color effect. Specifically, the colorant is any composition that provides opacity coverage to a surface to which it is applied and, generally, the colorant comprises a dry pigment or dye, alone or in combination with additional components. For example, the colorant may be a dry paint including pigment particles, other conventional paint components, and a liquid carrier that has been substantially removed by vaporization during the process to providing the dry paint.

As another example, the colorant may be an engineered sheet or laminate formed from suitable thermoplastic resins and including a substance, such as pigment particles or dye molecules, in a sufficient concentration and with an appropriate distribution to produce a color effect. Specifically, the colorant may be formed from thermo-formable engineering polymer resins, including but not limited to acrylics, urethanes, polyvinyl chloride (PVC), polyvinylidene fluoride (PVDF) and polyvinylidene chloride (PVDC). The various layers of the colorant may possess differing compositions and/or properties effective to apply color to a surface.

The term "surface" is used herein to refer to any outer layer or boundary of an object or substrate which is capable of receiving a color component thereon. Suitable surfaces may be substantially two-dimensional and flat or substantially three-dimensional and including curves, angled portions or the like. In one embodiment, the surface to which color component is applied using the articles and methods of the invention comprises an architectural surface, i.e., a surface of a building, a building fixture (i.e., appliances), furniture, and the like. The architectural building surface may be an interior surface within the building or an exterior surface on an outer portion of the building. Substantially three-dimensional architectural surfaces can include, for example, edge treatments of two-dimensional surfaces such as moldings (e.g., moldings around windows or doorways), floorboards, appliances, furniture, and the like. The architectural surface may be permanently installed or may be temporarily installed or portable. The products of the present invention can further be applied to surfaces of articles to give them the same or different texture and/or appearance of architectural surfaces. For example, the products hereof can be used to apply a color layer to appliances, furniture, and other architectural articles. Additional surfaces suitable for application of color using the articles and methods of the present invention will be apparent to those skilled in the art in view of the present disclosure.

Figure 2:
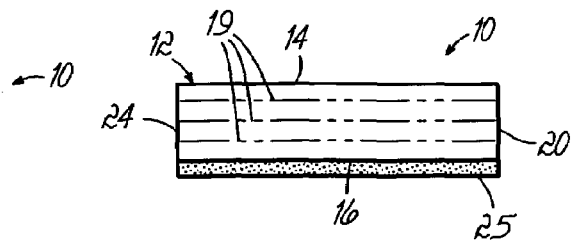
FIG. 2 is a diagrammatic end view of the article of FIG. 1.

With reference to FIGS. 1 and 2, an article 10 for applying color on a surface (not shown) according to the present invention includes a planar sheet 12 of a dry colorant or dry color component and a layer 25 of an adhesive or bonding agent. The sheet 12 has a front sheet surface 14, a rear sheet surface 16 opposite the front sheet surface 14, four peripheral edges 20, 22, 24, 26, and a margin 18 disposed adjacent to peripheral edges 20, 22, 24, 26. The margin 18 defines an annular strip or band of dry colorant extending circumferentially about the peripheral edges 20, 22, 24, 26 of the sheet 12 and inwardly a given dimension or width toward the center of the sheet 12. Examples of articles 10 are disclosed in U.S. Provisional Application No. 60/343,146, entitled "Articles and Methods for Applying Color on Surfaces" and filed on Dec. 20, 2001, U.S. Provisional Application No. 60/380,225, entitled "Articles and Methods for Applying Color on Surfaces" and filed on May 13, 2002, and U.S. Provisional Application No. 60/380,205, entitled "Articles and Methods for Applying Color on Surfaces" and filed on May 13, 2002. Each of these applications is hereby incorporated by reference herein in its entirety. The article 10 may be a laminate formed from multiple layers of thermoplastic resins, as indicated by reference numeral 19 and shown in dot-dashed lines in FIG. 2.

Typically, the sheet of dry color component will have a thickness of less than about 0.003 inch (3 mils or 0.08 mm). In one embodiment, the sheet of dry color component will have a thickness of from about 0.0003 inch (0.3 mils) to about 0.003 inch (about 0.008 mm to about 0.08 mm), more specifically from about 0.0003 inch to about 0.0015 inch (about 0.008 mm to about 0.04 mm). In another embodiment, the sheet of dry color component will have a thickness about 0.0007 inch (0.02 mm) or less, and even more specifically not more than about 0.0005 inch (0.013 mm).

In embodiments wherein the article comprises the sheet of dry color component and adhesive, in the absence of layers such as liners or carriers, the thickness of the articles will be essentially that of the sheet of dry color component, as the adhesive layer is typically relatively thin, i.e., generally less than about 1 mil (0.001 inch or 0.03 mm) in thickness, more specifically about 0.5 mil (0.0005 inch or 0.013 mm) in thickness. Thus, in one embodiment, the sheet of dry color component and adhesive combined have a thickness of about 0.003 inch (3 mils or 0.08 mm) or less, more specifically from about 0.0003 inch to about 0.003 inch (about 0.008 mm to about 0.08 mm), even more specifically from about 0.0003 to about 0.0015 inch (about 0.008 mm to about 0.04 mm), and yet more specifically about 0.0007 inch (0.013 mm) or less. Advantageously, edges of adjacent sheets may thus be overlapped without significant overlap appearance. In further embodiments wherein one or more releasable liners are included, the thickness of the articles will be increased.

The adhesive layer 25 is applied to a substantial portion of the rear sheet surface 16 of sheet 12. The adhesive layer 25 may be any bonding agent operative for creating a secure adhesive bond between the article 10 and a surface (not shown). A particularly suitable adhesive is pressure-sensitive so that the article 10 can be secured to the surface and repositioned before applying a pressure of a magnitude sufficient to create a final adhesive bond with the surface.

The article 10 may be wound into a roll and applied to the surface with a suitable applicator (not shown) operative for dispensing the article 10 in a controlled manner. Alternatively, the article 10 may be applied to the surface manually without the use of an applicator. It is appreciated that the applicator may facilitate, or otherwise implement, certain embodiments of the present invention for eliminating, reducing, or otherwise lessening the visual perceptibility of seams between an adjacent pair of articles 10.

Because the dimensions of the article 10 are limited, multiple articles 10 are positioned with an adjoining or juxtaposed relationship to apply color to certain surfaces, such as architectural surfaces including interior and exterior walls of residential and commercial buildings. As a result, one of the peripheral edges 20, 22, 24, 26 of one sheet 12 is positioned adjacent to one of the peripheral edges 20, 22, 24, 26 of another adjacent sheet 12. Depending upon the precise placement of the sheets 12, the respective margins 18 of the juxtaposed pair of sheets 12 are overlapping, abutting, or separated or spaced apart by a groove or gap so as to create a seam. The seam presents an irregularity in the otherwise smooth, uninterrupted coverage of the surface by the articles.

Seams tend to be visually perceived or discerned by an observer and, if uncorrected, degrade the aesthetic appearance of color supplied by the articles 10 to the surface. According to the principles of the present invention, the visual perceptibility of the seam may be lessened, reduced or eliminated by modifying one or more properties or characteristics of article 10. The change in visual perceptibility of the seam may be promoted by a physical mechanism, a chemical mechanism, an optical mechanism, or combinations thereof.

Adjacent articles 10 may be overlapped or gapped due to, for example, imprecision during application to the surface. Overlaps or gaps between adjacent articles 10 may also be introduced due to dimensional irregularities in the surface to which the articles 10 are being applied. For example, architectural surfaces can bow in and out, sway, lean and frequently lack plumb inner and outer corners. Furthermore, features such as windows and doors present in most architectural surfaces are often out of vertical plumb, sometimes dramatically, and the ceiling line can sway and dip unevenly. These irregularities can be produced by settling of the structural components of the building or by construction errors. Overlap is also present when a custom dimensioned article is used to patch an existing color effect on a surface to, for example, cover or conceal a mark or to cover a small area from which the original color has been removed.

Figure 3:
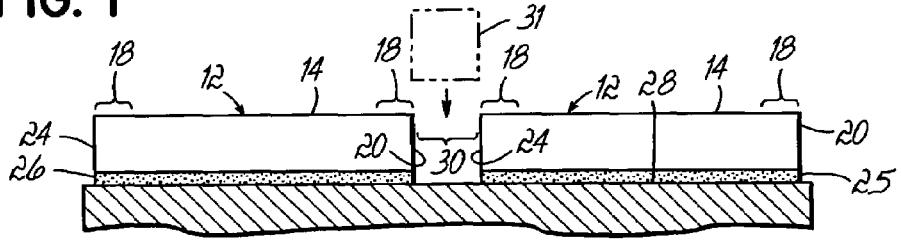
FIG. 3 is a diagrammatic end view of two articles, as in FIG. 1, applied with a juxtaposed relationship to the surface such that a gap is formed between the articles.

With reference to FIG. 3 in which certain dimensions are exaggerated for purposes of illustration, a plurality of, for example, two articles 10 may be applied to a surface 28 so as to create a gap or groove 30 between each juxtaposed pair of articles 10. The adhesive layer 25 of each article 10 contacts a confronting portion of the surface 28 and promotes an adhesive bond therebetween. When the articles 10 are applied to the surface 28, margin 18 of one sheet 12 is juxtaposed in a non-overlapping manner with margin 18 of the adjacent sheet 12 so as to generate the groove 30. The groove 30 may have uniform width or a varying width and may be linear or non-linear along extent of the juxtaposition.

According to principles of the invention, a filler may be introduced into the groove 30 after the articles 10 are applied to surface 28. The filler may have any suitable structure or form having one or more characteristics capable of reducing the visual perceptibility of the groove 30.

In one embodiment, the filler is a grout 31 composed of a spreadable material that has physical attributes at ambient temperature, such as a suitably low-viscosity to promote spreadability, suitable for being received into the groove 30. The grout 31, after application and curing, may be any material having visual characteristics similar to the visual characteristics of the sheet 12 of the adjacent articles 10 and, preferably, any material that is imperceptible or indistinguishable in visual appearance with the visual appearance of sheet 12 of the adjacent articles 10. To that end, the grout 31 may incorporate a polymer or resin similar to the polymer or resin forming the base material of the sheet 12 or the base material of at least one layer of the sheet 12 that is laminated. The grout 31 typically incorporates a substance, such as a pigment or a dye, operative to provide the desired visual characteristics and a suitable solvent or other spreading agent. After the grout 31 is received in the groove 30, a portion of the spreading agent preferably evaporates over a characteristic curing time during which, among other things, the viscosity of the grout 31 is significantly reduced.

The present invention contemplates that the grout 31 may be applied to the groove 30 between juxtaposed articles 10 either manually or with the assistance of an applicator (not shown). Specifically, for manual application, grout 31 is introduced or injected into groove 30 and wiped or troweled to remove any excess so that the residual grout 31 is generally co-planar with the respective front sheet surfaces 14 of sheets 12. An applicator suitable for use in this aspect of the present invention includes a reservoir, which may be refillable, holding a quantity of the grout 31, a dispensing element for introducing the grout 31 at a regulated uniform rate into the groove 30, and a troweling or wiping element for removing any excess grout 31 not received in the groove 30.

Figure 4:
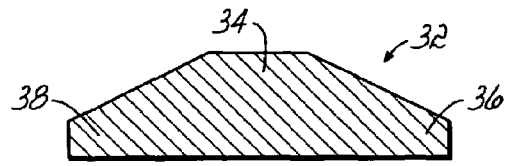
FIG. 4 is a transverse cross-end view of a filler strip constructed according to the principles of the present invention for filling a gap between adjacent articles as illustrated in FIG. 1.

In another embodiment of the invention and with reference to FIG. 4, another suitable filler according to the present invention is a filler strip 32 having any form capable of being associated with the groove 30 in a manner that eliminates, reduces, or lessens the visual perceptibility of groove 30. As illustrated, the filler strip 32 includes a center portion 34 and opposed thinner, flexible marginal portions 36, 38 flanking the center portion 34. The center portion 34 is adapted to be at least partially received into the groove 30 with each of the marginal portions 36, 38 overlapping a corresponding one of the margins 18 of the two sheets 12. In one embodiment, the center portion 34 is rigid and the marginal portions 36, 38 are malleable or conformable. Preferably, the filler strip 32 substantially fills the groove 30 in a manner that resists substantial removal forces after application. As illustrated, the thickness of the marginal portions 36, 38 is less than a thickness of each sheet 12 so that the marginal portions 36, 38 add a minimal incremental thickness to the overall thickness of the adjacent articles 10. Alternatively, the marginal portions 36, 38 of the filler strip 32 may be optically transparent or translucent such that the color provided by sheets 12 is visible therethrough.

Figure 5:
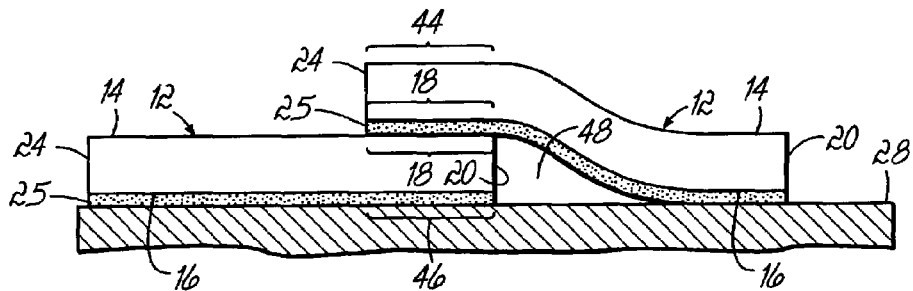
FIG. 5 is a diagrammatic end view of a juxtaposed pair of articles having overlapping margins.
Figure 6:
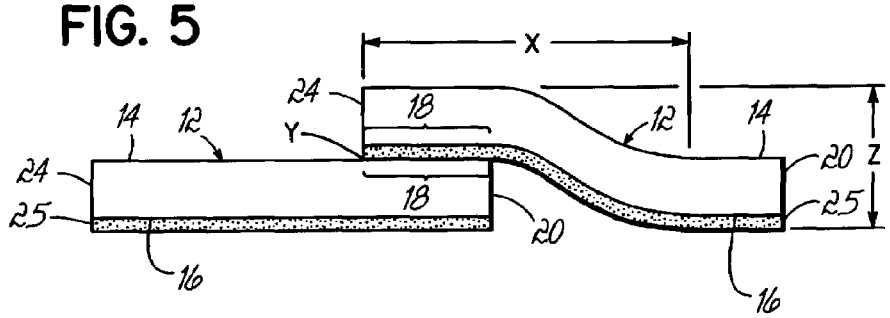
FIG. 6 is a diagrammatic end view similar to FIG. 5.

With reference to FIGS. 5 and 6 in which certain dimensions are exaggerated for purposes of description, multiple articles 10 may be applied for delivering a color to a surface such that the margin 18 adjacent one of the peripheral edges 20, 22, 24, 26 of one sheet 12 has an overlapping relationship with the margin 18 adjacent one of the peripheral edges 20, 22, 24, 26 of another sheet 12. As illustrated in FIGS. 5 and 6, a portion of the margin 18 of the overlying sheet 12 provides an overseam 44 with an exposed surface visible to an observer and a portion of the margin 18 of the underlying sheet 12 is captured as an underseam 46 between the overseam 44 and the surface 28. Typically, the overlap between overseam 44 and underseam 46 will be less than or equal to about 0.5 inches, although the present invention is not so limited as it is contemplated that the overlap between the articles 10 could extend over the entire area of sheet 12. The average thickness of the overlapping overseam 44 and underseam 46 is less than about 6 mils. Collectively, the overseam 44 and underseam 46 form a seam that, if not modified according to one or more embodiments of the present invention, would otherwise likely be visually perceived by an observer of the color effect provided to the surface 28.

With continued reference to FIGS. 5 and 6, the overseam 44 and underseam 46 may be characterized in three dimensions by a height in a z-direction, a width in the x-direction, and a length in the y-direction. It is appreciated that the seam, formed by overseam 44 and underseam 46, extends in the y-direction into the plane of the page of FIGS. 5, 6 and that the effective dimension of the seam in the x-direction typically varies in the y-direction. The incremental height added by the overseam 44 in the z-direction is substantially equal to the thickness of margin 18. A portion of the seam may have a non-contacting relationship with the surface 28 so that a cavity 48 is created between a portion of the margin 18 and the surface 28. Another portion of the overseam 44 creates an abrupt, sharp edge at peripheral edge 24. The discontinuity in the otherwise substantially planar surface of the juxtaposed articles 10 introduced by the presence of edge 24 provides an observable or perceptible visual indication of the location of edge 24 to a viewer of surface 28.

According to the principles of the present invention, the entire sheet 12 or at least the margin 18 of sheet 12 near at least one of the peripheral edges 20, 22, 24, 26 is modified in a manner that eliminates, reduces or lessens the visual perceptibility of the overseam 44 created by the overlap between the respective margins 18 of a juxtaposed pair of sheets 12. It is contemplated that the various principles of the present invention may be combined for achieving the elimination, reduction or lessening of the visual perceptibility of the seam provided by the overlapping overseam 44 and underseam 46.

In one embodiment of the present invention, the margin 18 adjacent at least one of the peripheral edges 20, 22, 24, 26 is thinner, before application to surface 28, than other portions of sheet 12 laterally disposed between the margins 18. Typically, the average thickness of the margin 18 adjacent at least one of the peripheral edges 20, 22, 24, 26 may be reduced to about one-half of the thickness of the remaining portions of the dry colorant sheet so that, after overlapping, the composite thickness of the sheets is uniform or substantially uniform. However, the present invention is not so limited. All regions of the article 10, including the overlapping overseam 44 and underseam 46 when the margin 18 is overlapped with the margin 18 of another sheet 12, should have an opacity index ranging from about 0.95 to 1.0, as measured according to ASTM D2805 entitled "Standard Test Method for Hiding Power of Paints by Reflectometry (Spectrometer)."

Figures 7, 8:
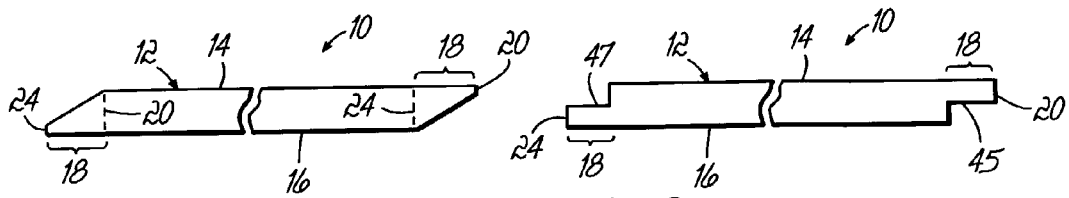
FIG. 7 is a diagrammatic end view of an article in which the margins are thinned according to principles of the present invention.
FIG. 8 is a diagrammatic end view of an article in which the margins are thinned according to principles of the present invention.

Referring to FIG. 7 and according to one specific embodiment of the present invention in which the margin is thinned, the margin 18 of sheet 12 is beveled or tapered outwardly toward peripheral edges 20, 24. It is appreciated that the margin may be tapered adjacent to any of the peripheral edges 20, 22, 24, 26. As illustrated in FIG. 7, the margin 18 is tapered toward the front sheet surface 14 toward peripheral edge 20 and tapered toward the rear sheet surface 16 adjacent peripheral edge 24. The tapering of margin 18 provides oppositely oriented wedge-shaped surfaces 40, 42 that extend into and out of the plane of the page of FIG. 7.

Specifically, margin 18 tapers from a first thickness at each of respective common boundaries 41, 43 shared with a peripherally inward portion of the sheet 12 to a second lesser thickness at the respective peripheral edges 20, 24. As a result, the thickness of the margin 18 decreases in a direction from each of the common boundaries 41, 43 to the corresponding one of the peripheral edges 20, 24. It is appreciated that the margin 18 may be tapered with a non-uniform taper angle so that the thickness of the wedge-shaped surfaces 40, 42 is not monotonically varying as illustrated in FIG. 7. For example, the margin 18 near at least one of the peripheral edges 20, 22, 24, 26 may be feathered so that the thickness in the z-direction and lateral width in the x-direction of the thinning vary randomly with location.

In another specific embodiment in which the margin is thinned and with reference to FIG. 8, the margin 18 of sheet 12 is shaped as a joint half 45 at peripheral edge 20 and as a complementary joint half 47 at the opposite peripheral edge 24. When the margin 18 of one article 10 is overlapped with the margin 18 of another article 10 and adhesively secured, the joint halves 45, 47 provide a complete lap joint. The overlapping lap joints 45, 47 preferably have an effective thickness that produces a flush or continuous surface with the peripherally inward portions of each of the juxtaposed articles 10. It is appreciated that joint halves 45, 47 may have any complementary structure capable of being associated as a lap joint and is not limited to the specific embodiment depicted in FIG. 8. With reference to FIGS. 7 and 8, an average thickness of the margin 18 illustrated in FIGS. 7 and 8 is less than an average thickness of peripherally-inward portions of sheet 12. It is contemplated by the invention that the margin 18 may be thinned by, for example, providing wedge-shaped surfaces 40, 42 or joint halves 45, 47, during manufacture of the article 10 by the forming process (e.g., printing of the sheet 12) or by a mechanical or wet chemical process, after forming, that selectively removes a suitable thickness of the sheet 12. Alternatively, it is appreciated that mechanical and wet chemical thinning of the margin 18 may be performed at the point of application of article 10 to the surface. Mechanical thinning processes generally rely on mechanical action, such as abrasion or cutting, for material removal whereas wet chemical thinning processes generally rely on a chemical reaction that etches, dissolves or otherwise removes material. For chemical thinning, the thickness of removed material may be controlled, for example, by regulating the exposure time of the dry colorant of the margin 18 to the etchant chemical. To that end, the etchant chemical may be applied with a suitable applicator and removed with a device, such as a wet vacuum, or by simple wiping with an appropriate absorbent article or other removal device when the exposure time lapses. It is contemplated that the etchant chemical may be provided to the consumer in a kit also containing the article 10 for applying color and that the applicator for the etchant chemical and/or the removal device may be incorporated into the applicator for applying the articles 10 to the surface 28 (FIG. 5).

Figure 9A:
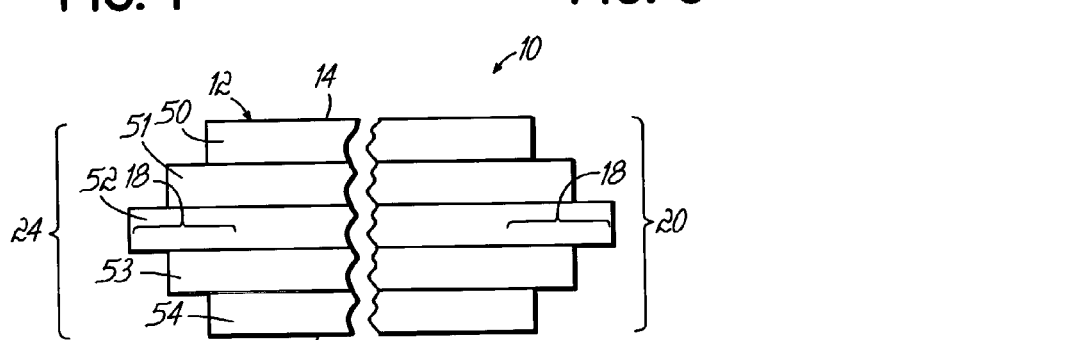
FIGS. 9A and 9B are diagrammatic cross-sectional views of an article in which the margins are thinned according to principles of the present invention.

With reference to FIG. 9A and in accordance with the principles of the present invention, the sheet 12 of article 10 is formed from a plurality of, for example, five layers 50-54 and is effectively thinned in vicinity of the margin 18 by contouring at least the respective peripheral edges 20, 24 so as to provide a tiered or rounded edge structure. To that end, the center layer 52 of sheet 12 projects in a laterally outward direction beyond layers 50, 51, 53 and 54 and layers 51 and 53 project laterally outward beyond layers 50 and 54. When a juxtaposed pair of the articles 10 is applied to surface 28 (FIG. 5) with margin 18 at, for example, peripheral edge 20 of one of the articles 10 overlapped with, for example, peripheral edge 24 of another of the articles 10, the overlapping thickness of the overseam 44 and underseam 46 will be significantly reduced due to the contact between the respective rounded edge structures. In addition, the tiering of the margin 18 at edges 20, 24, when viewed at a typical viewing distance from surface 28, provides a rounded appearance that operates to further eliminate, reduce or otherwise lessen the visual perceptibility of edges 20, 24.

Figure 9B:
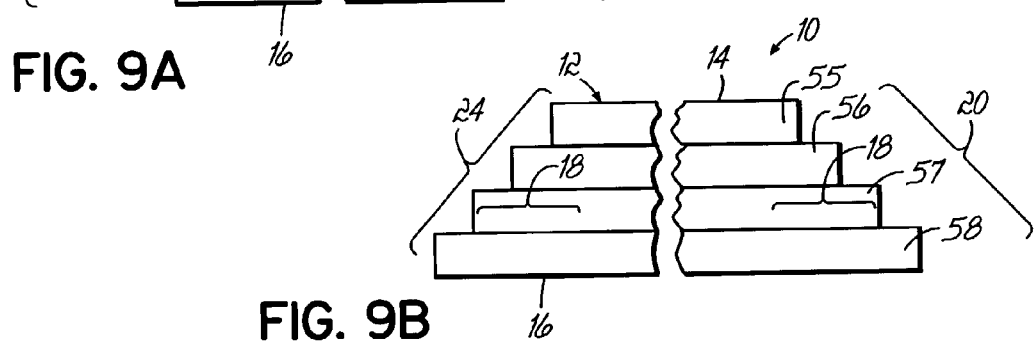

In an alternative embodiment and with reference to FIG. 9B, the sheet 12 of article 10 is formed from a plurality of, for example, four layers 55-58 and is rounded in vicinity of the margin 18 by contouring at least the respective peripheral edges 20, 24 so as to provide a tiered or rounded edge structure. Specifically, the laterally outward projection of layers 55-58 progressively decreases from layer 55 to layer 58 so that layer 55 projects outwardly the least relative distance and layer 58 projects outwardly the greatest relative distance. Similar to the embodiment of the present invention illustrated in FIG. 9A, when a pair of the articles 10 are applied to surface 28 (FIG. 5) an edge 20 of one of the articles 10 overlapped with another edge 24 of another of the articles 10, the overlapping thickness will be significantly reduced. In addition, the tiering of edges 20, 24, when viewed by an observer at a typical viewing distance from surface 28, provides a rounded appearance that operates to further eliminate, reduce or otherwise lessen the visual perceptibility of edges 20, 24.

When margin 18 having one of the constructions illustrated in FIGS. 7, 8, 9A and 9B is overlapped with a margin 18 of another juxtaposed article 10, which may have a complementary reduced-thickness construction, the average opacity index of the entire surface of the article 10 is between about 0.95 and 1.0, as measured according to ASTM D2805. The average thickness of the overlapping portions of the respective margins 18 of a juxtaposed pair of articles 10 is less than 6 mils.

According to another embodiment of the present invention and with renewed reference to FIGS. 1 and 2, the visual perceptibility of overlapped margins 18 of adjacent articles 10 is eliminated, reduced or otherwise lessened by incorporating an additive operative to modify the rheology of the sheet 12. The rheology-modifying additive is operative to promote selective coalescence, densification or fusion of the overlapped portions of the margin 18 of juxtaposed sheets 12. The action of the rheology-modifying additive may occur spontaneously or with the assistance of an initiator. A compressive pressure may also be applied to margin 18 at the point of application without departing from the spirit and scope of the invention. The rheology-modifying additive may be any chemical agent that temporarily increases the workability and flexibility of the sheet 12. The rheology-modifying additive should be inactive, or otherwise dormant, while the article 10 is stored and before application to the surface 28 (FIG. 5). The rheology-modifying additive may volatize or evaporate from the margin 18, after a characteristic working period, or may remain resident in the article 10 after the coalescence is concluded. Once coalescence is concluded, the rheology-modifying additive should be no longer present or should remain present in a concentration such that the article 10 is not overly susceptible to mechanical damage.

It is appreciated that the rheology-modifying additive may be dispersed throughout the dry colorant forming sheet 12 or may be locally confined to dry colorant forming the margin 18. In either instance, the application of compressive pressure, if required to provide the coalescence, can be restricted to the margin 18 by using a suitable roller of the like of a limited width. It is further appreciated the article 10 may need to be stored in a controlled environment after manufacture so as preserve the chemical action of rheology-modifying additives that are volatile. For example, articles 10 containing such volatile rheology-modifying additives may be stored after manufacture in a sealed container (not shown), such as a Mylar bag. The fluid impermeable walls of such sealed containers would prevent or otherwise inhibit loss due to volatilization, evaporation or vaporization of the rheology-modifying additives until the article 10 is unsealed from the container at the point of application for providing color to the surface 28 (FIG. 5). It is appreciated that any loss of the rheology-modifying additive due to volatilization is significantly reduced if the article 10 is merely tightly rolled.

In certain embodiments of the invention, the rheology-modifying additive may be a plasticizer added to the formulation of the material forming the sheet. The plasticizer would allow the dry colorant of the sheet 12 to flow for a period until the concentration of temporary plasticizer is sufficiently reduced by volatilization. Typically, the plasticizer will be present in the dry colorant of sheet 12 after manufacture at a concentration of less than about 30 wt. %. Plasticizers suitable for use in the present invention include propylene glycol, ethylene glycol, dibutyl phthalate and tricyresyl phosphate. Another plasticizer suitable for use in the invention is benzyl phthalate, which is available commercially under the SANTICIZER® tradename from Ferro Corporation (Cleveland, Ohio). In addition, the rheology of thermoplastic polymers used to form article 10 may be modified by, for example, varying the type of polymer resin, blending various different polymer resins, or varying the molecular weight of the polymer.

In other embodiments of the invention and with continued reference to FIGS. 1 and 2, the rheology-modifying additive is a liquid-sensitive chemical agent operative to coalesce the margin 18, when selectively exposed to a suitable initiator consisting of an activation liquid at the point of application, after the article 10 is applied to the surface 28 (FIG. 5). The activation liquid promotes a chemical reaction with the liquid-sensitive chemical agent that coalesces the dry colorant forming the margin 18 so that the thickness of the overlapped overseam 44 and underseam 46 (FIG. 5) is reduced and so that the exposed edge 24 of the overseam 44 is rounded or curved. Both effects are believed to reducing the visual perceptibility of the overlapping ones of margins 18 of a juxtaposed pair of articles 10.

The chemical reaction between liquid-sensitive chemical agent and the activation liquid is controlled to provide a predetermined thickness reduction of the overseam 44 and underseam 46 and/or rounding of the exposed edge of the overseam 44 (FIG. 5). Preferably, after a predetermined reduction and/or rounding is achieved, the activation liquid is consumed or spent and the chemical reaction ceases or otherwise halts. Alternatively, the activation liquid may be removed or a sufficient amount of an appropriate neutralizing agent may be added. The liquid-sensitive chemical agent and the activation liquid should be compatible with the chemistry of the dry colorant forming the sheet 12 such that the physical properties and color of the article 10 are not significantly affected once coalescence is induced and concluded. The liquid may be applied to sheet 12 at ambient temperature or heated before application. It is appreciated that the liquid-sensitive chemical agent may be dispersed throughout the dry colorant forming sheet 12 or may be localized in the dry colorant forming the margin 18. If the entire sheet 12 contains the liquid-sensitive chemical agent, the application of the activation liquid should be controlled to wet only the margin 18, such as by employing a suitable applicator of a restricted effective application width. It is contemplated that the activation liquid may be provided in a kit also containing the article 10 for applying color and that the applicator for the activation liquid may be incorporated into the applicator for applying the article 10 to the surface 28 (FIG. 5).

In other embodiments of the invention and with continued reference to FIGS. 1 and 2, the rheology-modifying additive is a thermally-activated chemical agent activated, at the point of application to surface 28 (FIG. 5), when heated above ambient temperature. The thermally-activated chemical agent has a characteristic activation temperature that must be exceeded to initiate the coalescence. Below the activation temperature, the thermally-activated chemical agent is substantially inactive or inactive. The activation temperature of the thermally-activated chemical agent is selected such that article 10 does not experience any significant physical degradation or color change when heated to the activation temperature. Such thermally-activated chemical agents cause the dry colorant of the overlapped overseam 44 and underseam 46 to become more densely packed or to level by spreading for reducing the composite thickness and rounding the exposed peripheral edge 24 of the overseam 44 (FIG. 5).

To initiate coalescence, the margin 18 is exposed to a suitable heat source, such as a flow of heated air from a blower, a heated applicator or roller, or a laser, for a duration and at a temperature sufficient to cause the desired thickness reduction of the overlapped overseam 44 and underseam 46 and/or rounding of peripheral edge 24 of overseam 44 (FIG. 5). Optionally, a compressive pressure may be applied to margin 18 to assist the action of the thermally-activated chemical agent. If the entire sheet 12 contains thermally-activated chemical agent, the application of heat may be controlled so that only the margin 18 is heated to the characteristic activation temperature. For example, a heated roller of a suitable effective rolling width may be utilized. However, it is appreciated that the heat source may be operative to transfer heat by convection, conduction, radiation, or any combination thereof.

The chemistry of the thermally-activated chemical agent should be compatible with the chemistry of the dry colorant such that the physical properties of the dry colorant are not significantly affected by the presence of the thermally-activated compound, unless heat activated. Exemplary thermally-activated chemical agents appropriate for use in the invention as a copolymer include ethylene-vinyl acetate copolymer and polyvinyl acetate copolymer. Suitable ethylene-vinyl acetate resins are available under the tradename Ultrathen from Equistar (Houston, Tex.). Suitable polyvinyl acetate resins are available under the tradename VINNAPAS® from Wacker Polymer Systems (Adrian, Mich.). Generally, ethylene-vinyl acetate copolymer and polyvinyl acetate copolymer are known to have a softening range between about 50° C. and about 125° C. It is contemplated that other suitable copolymers could be selected that would have differing softening ranges for heat activation depending upon the specific application.

Sheets 12 formed of engineered films containing thermoplastic resins are readily deformed or placed in a state suitable for deformation by the application of a compressive pressure, when heated to a sufficiently high temperature. It follows that the rheology-modifying additive may be intrinsic to the formulation of the thermoplastic resin. For example, the base thermoplastic resin of the sheet 12 may be blended with another thermoplastic resin to provide the requisite heat sensitivity for inducing coalescence.

It is appreciated that the rheology-modifying additive may be enclosed in microcapsules for release and activation upon the application of an external trigger. Any suitable method of microencapsulation may be used to divide the rheology-modifying additive into minute liquid particles and to surround particles of the rheology-modifying additive with rupturable enveloping walls formed of a material having a suitable composition. The material forming the enveloping walls should be sufficiently thick and/or of a suitably compatible material to resist chemical attack by the encapsulated rheology-modifying additive and, preferably, is inert to the chemical action of the encapsulated rheology-modifying additive. At the least, the material of the enveloping walls should be impermeable to the confined rheology-modifying additive for a sufficient shelf life after manufacture to permit the articles 10 to be applied to the surface and release of the rheology-modifying additive. The microencapsulated particles of rheology-modifying additive may be evenly distributed with a uniform density in the sheets 12 or may be localized in the margin 18.

One method of initiating the action of the microencapsulated chemical agent is to provide frangible enveloping walls sufficiently thin to rupture upon mechanical or physical manipulation, such as a compressive pressure, during or shortly after application of the article 10 to surface 28. The enveloping walls should have a thickness sufficient to prevent premature release of the chemical agent by accidental rupture under the physical manipulation occurring during mixing and sheet fabrication and during storage. Other initiation or activation triggers include, but are not limited to, release by dissolving the enveloping walls with a suitable solvent and release by selectively exposing the enveloping walls to radiant energy such as heat or light.

In another embodiment of the invention and with continued reference to FIGS. 1 and 2, the rheology-modifying additive is a solvent at the point of application and operative to coalesce the dry colorant of margin 18. Such solvents promote a chemical reaction with the dry colorant forming the margin 18 that coalesces the polymer or resin base material of the dry colorant so that the thickness of the overlapped overseam 44 and underseam 46 (FIG. 5) is reduced and the exposed edge 24 of the overseam 44 (FIG. 5) is rounded or curved. The action of the solvent is controlled to provide a predetermined degree of thickness reduction and/or level of rounding. The solvent should be compatible with the formulation of the dry colorant such that the physical properties and color of the article 10 are not significantly affected in a permanent manner after the coalescence is conclude. The application of the solvent is preferably regulated so that the only the margin 18 is wetted. For sheets 12 formed from thermoplastic resins, suitable solvents include, but not limited to, toluene, methylethyl ketone, methyl isobutyl ketone, and ethanol, capable of providing the desired coalescence.

In another embodiment of the invention, the visual perceptibility of the seam created by the overlapping overseam 44 and underseam 46 of the respective margins 18 (FIG. 5) is reduced or eliminated by providing the article 10 (FIG. 5), in at least the vicinity of margin 18, with an additive or structure that mechanically compresses or collapses upon the application of a compressive pressure of a sufficient magnitude as an initiator after application of article 10 to the surface 28 (FIG. 5). Generally, the magnitude of the compressive pressure, manually-applied and unaided by mechanical assistance, is less than about 50 pounds per square inch (PSI) and, typically, is less than about 10 PSI. The compressive pressure may be applied using a pressure-applying device, such as a roller, of a suitable width that increases the magnitude of the applied compressive pressure due to the mechanical assistance in excess of the magnitude of the equivalent compressive pressure applied to the device. It is appreciated that the suitable width may be the entire width of the article 10. The selective collapse of the collapsible structure reduces the effective thickness of the overlapping overseam 44 and underseam 46 after a juxtaposed pair of articles 10 is applied to surface 28.

The compressive pressure may be a differential pressure consisting of a first pressure applied in the margin 18 and a lesser pressure applied to peripherally inward portions of the article 10. Alternatively, the compressive pressure may be applied uniformly in those specific embodiments of the invention in which the margin 18 is more susceptible to the effects of the compressive pressure than the remainder of the article 10. In the latter embodiments of the invention, the entire article 10 is modified so that the thickness is reduced by the application of a compressive pressure and the margin 18 is adapted to have a greater response to that compressive pressure so that the margin 18 experiences a greater thickness reduction than peripherally inward portions of the article 10. At the point of manufacture, the collapsible structure or additive is introduced into the formulation of the dry colorant or into the formulation of the material forming adhesive layer 25 (FIG. 5) or, as may be the case, is provided by a suitable forming process at the point of manufacture.

Figure 10:
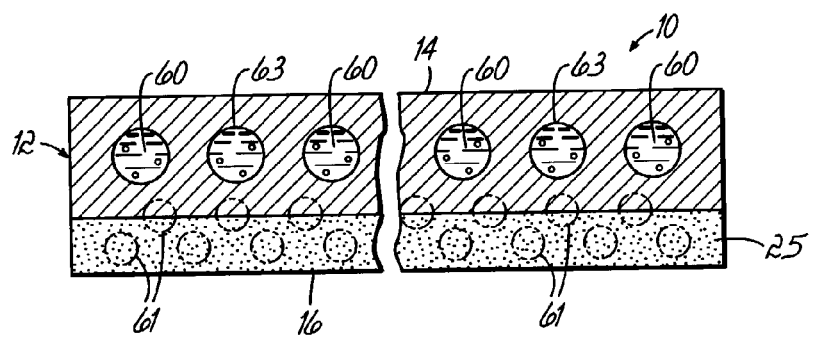
FIG. 10 is a diagrammatic cross-sectional view of a portion of an article having microparticles according to principles of the present invention.

In one specific embodiment of the invention and with reference to FIG. 10, the article 10 includes a plurality of microparticles 60, usually gas-filled, that are engineered to collapse or crush upon the application of a force at the point of application to surface 28 (FIG. 5).

It is appreciated that the gas-filled microparticles 60 may be incorporated in the sheet 12 of dry colorant as shown in FIG. 10, in the adhesive layer 25 as indicated by microparticles 61 shown in phantom lines in FIG. 10, or in both of these components of the article 10. It is appreciated that the microparticles 60, 61 may be positioned so as to span the boundary or interface between the adhesive layer 25 and the sheet 12 of dry colorant. The material forming the microparticles 60, 61 and the gas filling the interiors of the microparticles 60, 61 should be inert or otherwise non-reactive with the components of the sheet 12 and/or adhesive layer 25. Individual gas-filled microparticles 60, 61 may be of any closed geometrical shape, such as spheroidal.

The microparticles 60, 61 should have a sufficiently small dimension such that their presence does not introduce outwardly-extending irregularities perceivable by an observer viewing the front sheet surface 14 after the article 10 is applied to the surface 28 (FIG. 5) for which a color benefit is desired. Typically, the microparticles 60, 61 should have a maximum dimension less than about 75% of the thickness of the sheet 12 and may have a distribution of particle sizes in which a maximum particle size is less than about 75% of the thickness of the sheet 12. The microparticles 60, 61 may be dispersed uniformly throughout the volume of the sheet 12 and/or adhesive layer 25 (FIG. 5). Any fragments originating from the collapsed microparticles 60, 61 are retained within the sheet 12 or the adhesive layer 25, as may be the case.

It is appreciated that, in the alternative, the incorporation of microparticles 60, 61 into the dry colorant of the sheet 12 and/or adhesive layer 25 (FIG. 5) may be limited to the vicinity of margin 18. If the microparticles 60, 61 are present only in the margin 18 (FIG. 5) or in the adhesive layer 25 beneath margin 18, the thickness of the overlapped overseam 44 and underseam 46 (FIG. 5) will be reduced by the application of a compressive pressure thereto. If the microparticles 60, 61 are present throughout in the entire sheet 12, a differential compressive pressure is applied at the point of application so that the overlapped overseam 44 and underseam 46 and/or adhesive layer 25 are subjected to a greater compressive pressure than other portions of the article 10. Microspheres in the margin of the article 10 will have a reduced survival rate under the action of the differential pressure so that the overseam 44 and underseam 46 will be thinned collectively more than the remainder of the sheet 12.

Each of the microparticles 60, 61 has an outer wall 63 formed of any suitable material that is sufficiently thick and/or mechanically strong to resist crushing or collapse until the application of compressive pressure of a sufficient magnitude at the point of application after the article 10 is adhesively secured to the surface 28 (FIG. 5). Microparticles 60, 61 formed of hollow glass spheriods are conventional and readily apparent to a person of ordinary skill in the art. Exemplary microparticles 60, 61 in the form of hollow glass bubbles having a density in the range of 0.05 g/cc to 0.10 g/cc and a diameter ranging between 40 microns and 177 microns are disclosed in U.S. Pat. No. 6,194,064 (Keeley et al.). Engineered hollow glass microspheres of soda-lime-borosilicate glass composition are available commercially under the tradename SCOTCHLITE® Glass Bubbles from Minnesota Mining & Manufacturing Co. (St. Paul, Minn.).

Figure 11:
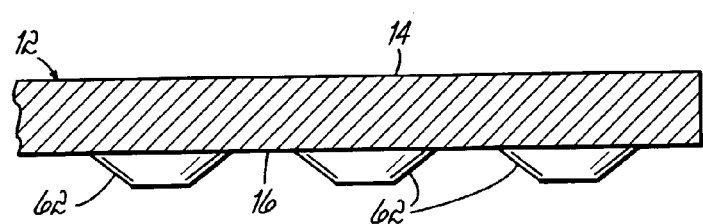
FIG. 11 is a diagrammatic end view of a portion of an article having projections according to principles of the present invention.

In an alternative embodiment and with reference to FIG. 11, the article 10 may include a plurality of projections 62 extending outwardly from the rear sheet surface 16 toward the surface 28 (FIG. 5) when the sheet 12 is applied thereto. The projections 62 may be, for example, truncated conical or frustoconical protrusions that taper from a base near rear sheet surface 16 toward an opposite tip and that have either a circular, oval or polygonal cross-sectional profile when viewed normal to the rear sheet surface 16. It is appreciated that the projections 62 may assume other geometries capable of collapsing, such as a semi-hemispherical shape or elongate ridges, without departing from the spirit and scope of the present invention. Adjacent ones of the projections 62 are spaced with a suitable spacing so that the collapse of adjacent ones of the projections 62 is not interfering. The projections 62 are provided with a tensile strength susceptible to collapse or buckle along an axis substantially parallel to a surface normal of the surface 28 when a compressive pressure of a sufficient magnitude is applied in a direction generally toward the surface 28.

In certain embodiments, the projections 62 may be uniformly distributed across the rear sheet surface 16 and the projections 62 in the margin 18 (FIG. 5) may be configured to be more susceptible to collapse. As a result, the application of a uniform compressive pressure to the article 10 would provide the desired thinning and edge-rounding for overseam 44 and underseam 46 (FIG. 5). In other embodiments of the invention, the projections 62 may have uniform construction and a greater thickness reduction achieved in the margin 18 by selectively applying a differential compressive pressure consisting of a larger compressive pressure applied to the overlapping overseam 44 and underseam 46 than in other areas of the article 10. In certain more specific embodiments, the projections 62 may be provided only in the vicinity of the margin 18 of the sheet 12 so that the thickness reduction due to collapsing projections 62 is limited to the margin 18.

In an alternative embodiment, the adhesive layer 25 (FIG. 5) may be printed onto the rear sheet surface 16 (FIG. 5) of the sheet 12 with a pattern of projections comparable to projections 62, which are collapsible by a compressive pressure applied at the point of application. Sufficient space is provided between adjacent projections of adhesive layer 25 to allow space for the adhesive layer 25 to expand when the compressive pressure is applied to precipitate the collapse.

Figure 12:
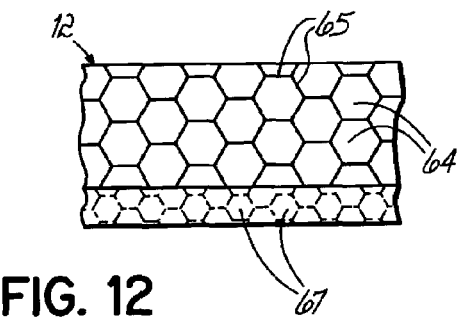
FIG. 12 is a diagrammatic cross-sectional view of a portion of an article having a cellular structure according to principles of the present invention.

In yet another alternative of the invention and with reference to FIG. 12, the sheet 12 or a portion of sheet 12 may be provided with a cellular structure including a plurality of cells 64, which may be open and interconnected or isolated and closed. The cells 64 are susceptible to collapse or buckling when a compressive pressure of a sufficient magnitude is applied in a direction generally toward the surface 28 (FIG. 5). Typically, the cells 64 include contiguous rigid cell walls 65 that surround a hollow interior cavity filled with a gas, such as air. Individual cells 64 may be provided with larger dimensions and/or more fragile cell walls 65 in the margin 18 (FIG. 5) than individual cells 64 in peripherally inward portions of the sheet 12 and, as a result, collapse to a thinner final structure upon the application of a compressive pressure than peripherally inward portions of sheet 12. Alternatively, the individual cells 64 may have a uniform susceptibility to collapse and a differential pressure may be employed during application to the surface such that the degree of collapse is greater in the margin 18 than in the peripherally inward portions of the sheet 12. Alternatively, the margin 18 of sheet 12 alone may be provided with the cellular structure so that only the thickness of the margin 18 is significantly modified by the application of a compressive pressure. In yet another alternative and as shown in dot-dashed lines in FIG. 12, the adhesive layer 25 may be provided with a plurality of cells 67, constituting a cellular structure, in addition to, or instead of, the cellular structure of the sheet 12.

Figure 13:
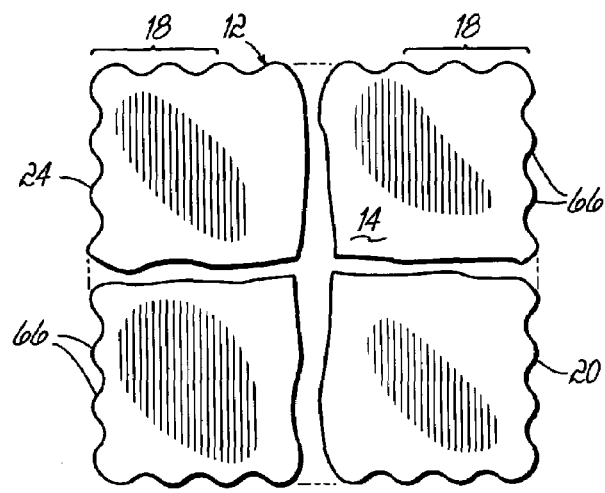
FIG. 13 is a diagrammatic view of a portion of an article having contoured peripheral edges according to principles of the present invention.

In yet another embodiment of the invention and with reference to FIG. 13 in which the dimensions are enlarged for purposes of illustration, one or more of the outer peripheral edges 20, 22, 24 26 of the margin 18 of sheet 12 are contoured or shaped in a pattern having a plurality of repeat elements 66. The repeat elements 66 comprise the individual components of the pattern that collectively provide the contoured edges 18, 22. The repeat elements 66 have any configuration, arrangement and/or dimension operative for reducing the visual perceptibility of the overlapping overseam 44 and underseam 46 (FIG. 5). For monochromatic or nearly-monochromatic colors, the repeat elements 66 and the transitions between adjacent ones of the repeat elements 66 are smoothly curved so that pointed or jagged portions are absent, although the present invention is not so limited. For articles 10 provided with a patterned front sheet surface 16 (FIG. 5), repeat elements 66 having, or separated by, jagged edges may be acceptable, according to the principles of the invention, so as to be complementary to a printed pattern 68 (FIG. 14).

The repeat elements 66 may be either periodic with a constant frequency and amplitude or aperiodic (i.e., random) with a variable, irregular frequency and amplitude. Repeat elements 66 having an amplitude and a wavelength of about 15 □m to about 12 mm are believed to be acceptable. The repeat elements 66 may be created in sheet 12 during the manufacturing process using any suitable device as would be recognized by a person of ordinary skill in the art, including but not limited to cutting implements such as pattern shears and laser cutting devices. Alternatively, the repeat elements 66 may be provided at the point of application by, for example, a hand-held tool or applicator device or by a blade or cutter incorporated into an applicator used to apply the article 10 to the surface 28 (FIG. 5). The repeat elements 66 alter the linear nature of the peripheral edge 24 of the overseam 44 (FIG. 5). The ability to perceive the overseam 44 is reduced by the presence of the repeat elements 66 because the human eye tends to perceive an irregular edge less readily than a linear edge.

Figure 14:
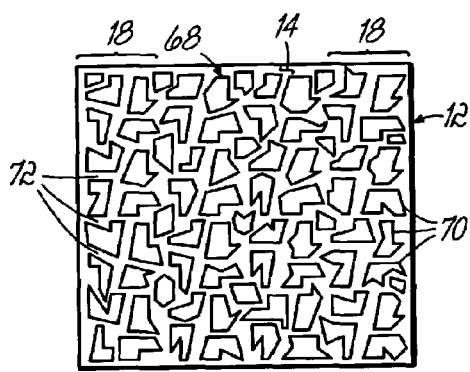
FIG. 14 is a diagrammatic view of a portion of an article having a pattern according to the principles of the present invention.

In yet another embodiment of the invention and referring to FIG. 14, a printed pattern, indicated generally by reference numeral 68, is provided on the front sheet surface 14 of the sheet 12. The printed pattern 68 contains various shaded areas or image elements 70 surrounded by contrasting areas 72. The image elements 70 and contrasting areas 72 may be configured to provide the printed pattern 68 with a visual perception of depth or may be configured to provide a three dimensional appearance to an observer. Alternatively, the printed pattern 68 may be provided with an actual depth or texture in three-dimensions by utilizing certain printing techniques known to persons of ordinary skill in the art. The image elements 70 and contrasting areas 72 may collectively form any geometrical shape or design effective for reducing the visual perceptibility of overlapping margins 18. It is contemplated by the invention that a printed pattern 68 of greater complexity may be created on the front sheet surface 14 by providing multiple different types of image elements 70 and/or multiple different types of contrasting areas 72.

The printed pattern 68 may be generated on the front sheet surface 14 by applying any ink or dye composition, either solvent-based or water-based, that is compatible with the dry colorant material forming the sheet 12. Conventional methods for applying the printed pattern include gravure, flexography, Mayer rod procedures, slot die applicators, roll coaters, and digital printing, each of which is particularly well-suited useful for applying a printed pattern to sheet material conveyed past a printing station.

Sheets 12 of dry colorant formed from thermoplastic polymer resins may be provided with a printed image by any suitable printing technique familiar to persons of ordinary skill in the art. Furthermore, the printed image formed on such sheets 12 may have a relief that provides a textured appearance in addition to a characteristic pattern provided by image elements 70 and contrasting areas 72.

The image elements 70 of printed pattern 68 may be spaced apart by a distance and with a frequency that reduces the visual perceptibility of the overlapping overseam 44 and underseam 46 (FIG. 5). The image elements 70 constituting the printed pattern 68 typically have any dimension and spacing compatible with seam concealment and configured or arranged so that the printed pattern 68 has no readily perceived organization. Adjacent ones of the image elements 70 in the printed pattern 68 may have a periodic, two-dimensional spacing with a lengthy periodicity so as to not be readily perceived at a normal observation distance. Preferably, however, the image elements 70 will be any printed pattern 68 of image elements 70 that exhibits no readily perceived organization, regularity, directionality, or orientation of the constituent image elements 70. In such an amorphous or non-ordered pattern, the orientation and arrangement of one image element 70 with regard to a neighboring image element 70 bears no predictable or discernable angular or spatial relationship to that of the next succeeding image elements 70 beyond. In one specific embodiment of the present invention, the printed pattern 68 on the front sheet surface 14 may comprise a matrix of pixels, as understood by persons of ordinary skill in the art. The printed pattern 68 will have a given pixel density measured in dots per inch. Each pixel in the printed pattern 68 is characterized by a hue within the visible electromagnetic spectrum and a pixel size, typically in the range of about 30 □m to about 100 □m. The printed pattern 68 of pixels may be printed on the front sheet surface 14 of the sheet 12 with an appropriate printing device, such as a dot matrix printer, laser printer or an ink jet printer, as understood by persons of ordinary skill as being operative to apply the ink or dye composition onto the surface.

Figure 15:
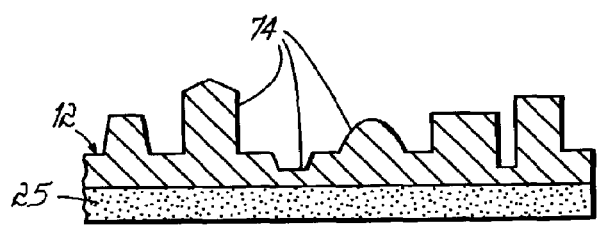
FIG. 15 is a diagrammatic cross-sectional view of a portion of an article having a three-dimensional topography according to the principles of the present invention.

In another embodiment of the invention and with reference to FIG. 15 in which feature sizes are exaggerated for illustration, the front sheet surface 14 (FIG. 2) of the sheet 12 is textured with a three-dimensional topography consisting of multiple surface features 74 either relieved into and projecting outwardly from the sheet 12. More specifically, the surface features 74 are formed, on a statistical average, above and/or below a plane containing the front sheet surface 14 and are spatially distributed in either a random fashion or a repeating pattern. The profiles of the surface features 74 are of any configuration or combination of configurations, such as angular, curvilinear, irregular, or the like.

The surface features 74 may be aperiodic or amorphous or may be added as an intentional or a deliberate pattern having a period that exhibits no readily perceived organization. Preferably, the pattern of surface features 74 is amorphous in that the surface features are non-uniform with regard to their size, shape, orientation, and spacing between adjacent feature centers. In a completely amorphous pattern, as would be preferred, the center-to-center spacing of adjacent surface features 74 is random, at least within a designer-specified bounded range, such that there is an equal probability of the nearest neighbor to a given surface feature 74 occurring for any arbitrary angular orientation within the plane of the sheet 12.

One method of creating the surface features 74 is to add a plurality of particulates, such as deformable wax prills or granules of a non-compressible material such as sand, to the article 10. The particulates may be located in the dry colorant of sheet 12 or in the adhesive layer 25 (FIG. 5) applied to the rear sheet surface 16 of the sheet 12. The spatial distribution of the particulates determines the topography of the dry colorant, which is preferably aperiodic or amorphous. The particulates have a maximum dimension greater than the thickness of the article 10 and, typically, have a particle size range of about 0.15 μm to about 150 μm. After the article 10 is applied to the surface 28 (FIG. 5), the particulates are visually perceived as outwardly-projecting irregularities.

Alternatively, the textured pattern of surface features 74 may be stamped, imprinted, embossed or impressed on and/or into the sheet 12 using, for example, a stamp or an embossing roller whose relief portions represent the texture as a negative image. The embossing may be accomplished by the application of sufficient heat and/or sufficient pressure to impart the texture. The textured pattern of surface features 74 may be applied at the point of application or at the point of manufacture, either before or after the sheets 12 are mounted to the surface 28 (FIG. 5). The embossing of an amorphous textured pattern in planar articles during manufacture is described in commonly-owned U.S. Pat. No. 6,193,918 (McGuire, et al.), which is hereby incorporated by reference herein in its entirety. At the point of application, the textured pattern of surface features 74 may be applied by heat and/or pressure using any suitable hand-held tool, such as an embossing roller or an applicator for article 10 that incorporates an embossing roller in its construction.

In another embodiment of the present invention, a textured backing layer (not shown) may be associated with the rear sheet surface 16 of the sheet 12 (FIG. 2) either during manufacture or at the point of application. The textured backing layer may be formed of any suitable material in which an impressed pattern may be conveyed, such as paper and other cellulosic materials, polymer films and woven or nonwoven fabrics, textile fabrics, glass or ceramic fabrics, and metallized layer(s). Alternatively, the backing layer may be one layer of a laminate. The backing layer should exhibit sufficient flexibility to allow bending, rolling and other similar manipulations of the article 10 which are required during manufacture and at the point of application. In one specific embodiment, the textured backing sheet is distinct from the sheet 12 and is associated with the article 10 at the point of application. To that end, the textured backing sheet is adhesively secured to the surface 28 (FIG. 5), and the article 10 is adhesively bonded to the exposed surface of the textured backing sheet.

In yet another embodiment and with reference to FIGS. 1 and 2, the dry colorant forming the margin 18 is adapted to transmit incident electromagnetic radiation having wavelengths in the visible portion of the spectrum. The article 10 is applied to surface 28 (FIG. 5) with an optically opaque margin 18 of one juxtaposed article 10 providing the underseam 46 (FIG. 5) and the optically transmitting margin 18 of the other juxtaposed article 10 providing the overseam 44 (FIG. 5). In that case, the color of margin 18 of the underlying juxtaposed sheet 12 will be visible through the overlying optically transmitting margin 18 of the other juxtaposed sheet 12. The optically transmitting margin 18 may be a transparent medium having a high optical transmission so that incident electromagnetic radiation traverses the margin thickness with little interference, such as absorption or reflection. It is appreciated that total optical transparency is not required and, to that end, the margin 18 of the overlying juxtaposed sheet 12 may be optically translucent so that the light reflected from the underlying opaque margin 18 is diffused. It is also contemplated by the invention that the entire sheet 12 may be transmissive of radiation having wavelengths in the visible portion of the electromagnetic spectrum.

In yet another embodiment of the invention, a light diffusing substance may be added to the formulation of the dry colorant forming sheet 12 (FIGS. 1, 2). One specific light diffusing substance is a pearlescent material capable of producing pearlescent-type effects, such as luster, depth, iridescence, metallic sheen, and multiple-color play. Pearlescent materials include, but are not limited to, ethylene glycol distearate (EGDS), light diffusing microbeads, mica flakes coated with a metal oxide, pearl essence originating from fish scales or artificially produced, lead carbonate, lead hydrogen arsenate, and bismuth oxychloride. The pearlescent material produces color-effects by interference, transmission and absorption of light. It is appreciated that articles 10 having laminated structures may incorporate that light diffusing substance into one or more individual layers. In addition and with reference to FIGS. 9A and 9B, the light diffusing substance may be provided only in the margin 18 of one of the visible layer edges of a laminated sheet 12, as shown in FIGS. 9A and 9B.

It is appreciated that the thickness of the dry colorant forming the sheet 12 will affect the perceptibility of the seam formed by the overlapped overseam 44 and underseam 46. Accordingly, thinning the dry colorant of the entire sheet 12 and the adhesive layer 25 to a thickness less than about 3 mils may reduce the visual perceptibility of the seam.

The dry color component may exhibit gloss characteristics as desired. In one embodiment of the invention, the dry color component exhibits glass characteristic of conventional architectural paints, such as flat, eggshell, satin, semi-gloss or gloss finishes, as desired. One of ordinary skill in the art will appreciate the difference between such finishes and high-gloss finishes such as are employed in, for example, the automotive industry. Gloss may be measured by specular reflectance of a beam of light at an angle of 60°. Typically, the specular reflectance for the sheet of dry color component of the present invention is less than about 60 gloss units at 60°. Specular reflectance may be measured using the test method described in GM Test Specification TM-204-A. The Byk-Mallinckrodt "multi-gloss" or "single gloss" gloss meters can be used for measuring specular gloss of the finished surface. Those gloss meters give values equivalent to those obtained from ASTM Method D-523-57. Either gloss meter is used with gloss standards covering the expected range of measurement, together with a piece of polished black glass plate of known refractive index. The gloss meter is calibrated by setting it to read the gloss of a highly polished standard and then reading the gloss of a working standard having a value preferably in the range of the test panel. The second standard should agree within one unit of its assigned value. At least two readings are taken on a different area of the test panel. These values are averaged if they agree within one unit. If the range is larger than one unit, additional regions are taken and a mean value is calculated. Desired gloss characteristics may be obtained by use of particles included in the dry color component sheet, a topcoat layer, post-treatment, texturization or the like in accordance with techniques known in the art.

It is contemplated by the present invention that the various approaches described herein for eliminating, reducing, or lessening the visual perceptibility of the seam created by the overlap of overseam 44 and underseam 46 (FIG. 5) may be combined without limitation to provide the desired seam concealment. As specific examples, the approach of providing a printed pattern (FIG. 14) may be used in combination with thinning the dry colorant forming the sheet or the margin (FIGS. 7 and 8) and contouring the peripheral edge of the margin (FIG. 13), the approach of thinning the dry colorant forming the sheet or the margin (FIGS. 7 and 8) may be used in combination with contouring the peripheral edge of the margin (FIG. 13), the approach of thinning the dry colorant forming the sheet or the margin (FIGS. 7 and 8) may be used in combination with providing a printed pattern (FIG. 14), the approach of thinning the dry colorant forming the sheet or the margin (FIGS. 7 and 8) may be used in combination with rounding the peripheral edge of the margin (FIGS. 9 and 9A), the approach of thinning the dry colorant forming the sheet or the margin (FIGS. 7 and 8) may be used in combination with adding a light diffusing substance to the dry colorant, the approach of thinning the dry colorant forming the sheet or the margin (FIGS. 7 and 8) may be used in combination with providing a texture with a three-dimensional topography of surface features (FIG. 15), the approach of thinning the dry colorant forming the sheet or the margin (FIGS. 7 and 8) may be used in combination with providing a collapsible structure (FIGS. 10 and 11), and the approach of adding a rheology-modifying additive, such as a thermally-activated chemical agent, to the dry colorant may be used in combination with providing a texture with a three-dimensional topography of surface features (FIG. 15).

It is also appreciated that the seam collectively formed by the overlapped overseam 44 and underseam 46 may be an integral part of a pattern formed on the surface when the article 10 is applied thereto. For example, the seam may participate in forming a pattern such as if each article is shaped as a square or block and multiple blocks are applied to the surface in a tiled pattern. As another example, the article 10 may have a pattern of vertical stripes that accommodate the vertical seam created between juxtaposed articles 10 as a feature in the pattern.

Various methods of forming article 10 are disclosed in U.S. Provisional Application No. 60/343,146, entitled "Articles and Methods for Applying Color on Surfaces" and filed on Dec. 20, 2001, U.S. Provisional Application No. 60/380,225, entitled "Articles and Methods for Applying Color on Surfaces" and filed on May 13, 2002, and U.S. Provisional Application No. 60/380,205, entitled "Articles and Methods for Applying Color on Surfaces" and filed on May 13, 2002, each of which is incorporated by reference herein. Generally, various additives and structures described herein may be provided to the dry color component and/or to the adhesive, as may be the case, during the manufacturing process producing article 10.

In view of the above, it will be apparent that the articles according to the present invention may be formed by a variety of methods and techniques. One such method is disclosed herein for illustrative purposes only. More particularly, with reference to FIG. 16, a small, laboratory scale, semi-automated process is shown. A releasable liner 100 is provided in roll form and is unrolled to travel through assembly 102 via rollers 104, 106, 108, 110, 112 and 114 to form a completed article 116 which is wound on roll 118. As will be described in further detail below, trimmed portions 120 are directed to roll 122. The releasable liner 100 is pulled as a web 101 through the assembly by a combination of the rolls 118 and 122 and a conveyer 124, for example a vacuum conveyor. A suitable vacuum conveyor may comprise a continuous conveyor belt with two pulleys having an array of spaced holes that are exposed to the vacuum chamber immediately below. Negative pressure (vacuum) is created by a forced air blower. As the belt passes over the chamber, a negative pressure is created at each hole such that the releasable liner 100 is securely held to the belt as it passes over the belt. This effect assists in preventing wrinkles in the releasable liner 100 as the applied color component dries. The vacuum conveyor belt speed may be matched to that of the drive rolls 118 and 122 driven by a drive 119. The shaft of a roller 126 from which the releasable liner 100 is supplied is connected with a friction clutch 128 which may be adjusted to obtain sufficient tension in the web 101 for smooth travel through the process. A Fife guiding unit 130 may be provided to track the web travel through the assembly.

Figure 16:
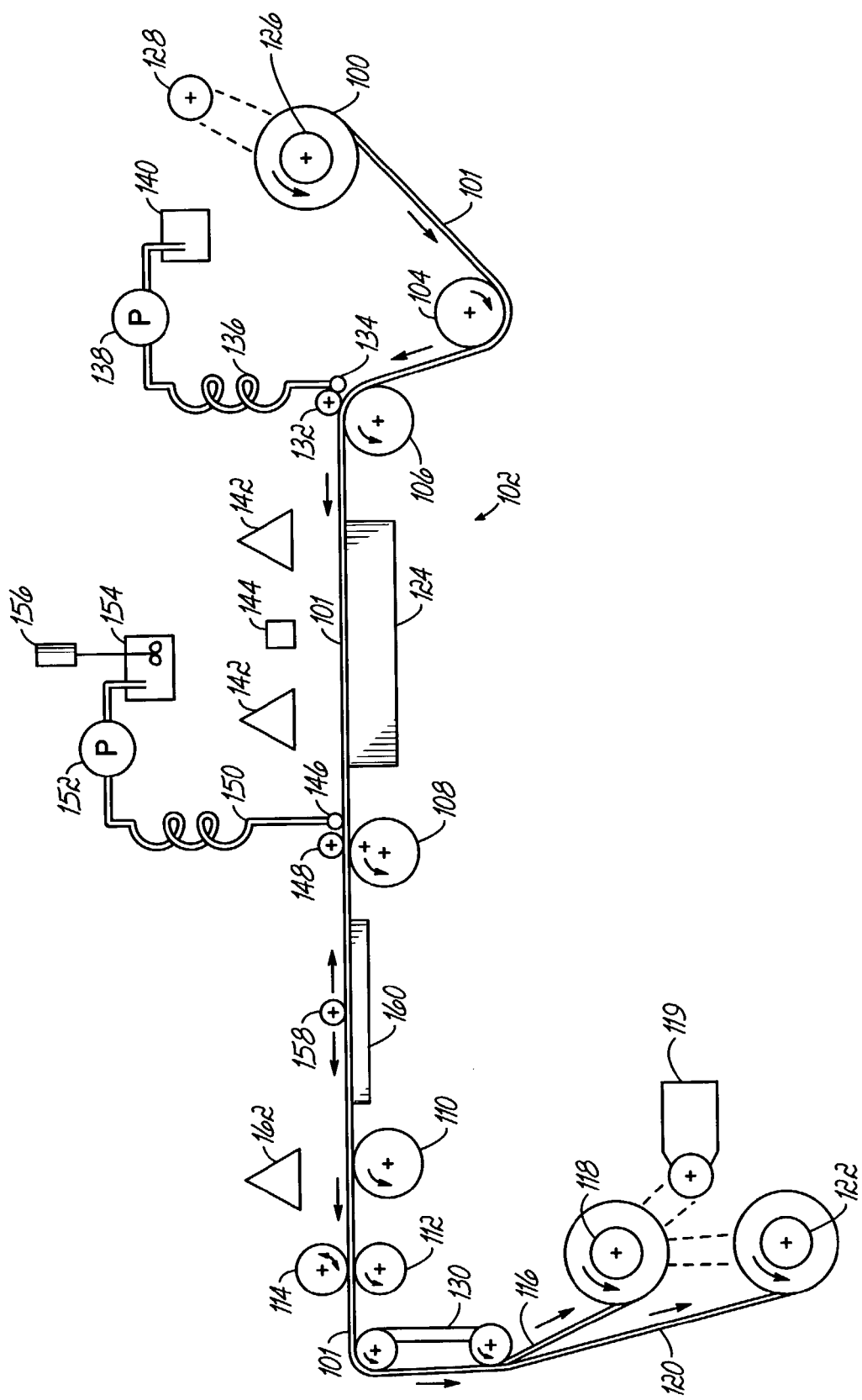
FIG. 16 is a schematic diagram of one process for producing an article for applying color on a surface according to the principles of the present invention.

A color component, such as wet paint, is applied to the web 101 of the releasable liner adjacent roller 106 using an applicator 132. The paint or other color component may be water-based or solvent-based as desired. In one embodiment, the applicator 132 comprises a #50 wire wound rod which may be held against the roller 106 by spring tension or the like such that the web 101 passes between the roller 106 and the applicator 132. The color component, such as paint, is introduced at the upstream side of the wire wound rod applicator 132 by a manifold 134. The manifold is fed by tubing 136 from a peristaltic pump 138 which draws the wet paint from a reservoir 140. To form the sheet of dry color component, the paint is dried on the web 101, for example as it passes over the vacuum conveyor 124 by the use of dryers. In the embodiment of FIG. 16, the dryers comprise two infrared heaters 142 which are aided by a forced ambient air duct 144. The air duct 144 may conveniently blow the exhaust from the vacuum conveyor 124. One skilled in the art will readily appreciated that solvent or other carrier removed during the drying process may be captured and recycled as desired. A sheet of dry color component is thus formed on the releasable liner web.

An adhesive is then applied to the sheet of dry color component on the surface opposite the releasable liner. For example, in the assembly 102 of FIG. 16, adhesive is applied to the surface of the sheet of dry color component on the web 101 at roller 108 by an applicator 148 which may comprise, for example, a #20 wire wound rod. The wire wound rod applicator 148 may be held against the roller 108 by spring tension or the like such that the web 101 passes between the roller and the applicator. Liquid adhesive is introduced at the upstream side of the wire wound rod applicator 148 by a manifold 146. The manifold 146 is fed by tubing 150 from a peristaltic pump 152 which draws the liquid adhesive from a reservoir 154. The liquid adhesive in a reservoir 154 is continuously stirred by a mixer 156. With the adhesive applied thereon, the web 101 travels to an oscillating fabric covered roller 158 which traverses back and forth in the machine direction above a slider plate 160 to impart a texture to the liquid adhesive applied to the sheet of dry color component on the web 101. A textured adhesive may allow the article to be more easily repositioned prior to permanent bonding. The adhesive is then dried, for example, by passing the web 101 under an infrared heater 162 at roller 110.

In a preferred embodiment, the web 101 travels through rollers 112 and 114, one of which is preferably in the form of a rotary cutting knife. In a more specific embodiment, roller 114 comprises two rotary cutting knives which are arranged adjacent the edges of the web in order to trim the web edges and provide the final article with the homogenous edges. In another embodiment, the roller 114 comprises a plurality of rotary cutting knife sets which are arranged so as to cut the web into two or more strips to provide smaller sized articles adapted for applying color to smaller sized areas as discussed above. The resulting article 116 is then wound on the roll 118 while the trimmed edges 120 are wound on the roll 122. As set forth above, the described assembly 102 and preparation process is illustrative only and variations thereof will be apparent to those skilled in the art. For example, release agents in the form of coatings, layers or the like may be provided in the process. Additionally, the sheet of dry color component may be provided in the final article in the absence of a release liner. For example, the sheet of dry color component may be formed on a processing web or forming belt and then separated from the processing web or forming belt prior to storage in roll or sheet form.

In an alternate embodiment, the articles according to the invention may be formed using a modified version of the process as described above wherein two releasable liner webs are employed. For example, a topcoat composition for forming a topcoat layer may be applied to a releasable liner web by reverse roll, extrusion coating or the like techniques, and dried thereon, for example with heat. A color component may then be applied to the dried topcoat layer, for example by reverse roll, gravure coating, printing, or the like techniques, and dried with heat. The adhesive may then be applied to a second releasable liner web, followed by laminating the releasable liner-topcoat-dry color component member with the adhesive-releasable liner member, with the dry color component and adhesive in facing relationship. Heat may be provided throughout this process by any suitable means including convection or radiation, for example infrared, ultraviolet or the like. One of ordinary skill in the art will also appreciate that this method may be used to provide an article including a single releasable liner by merely removing the second releasable liner from the adhesive once the releasable liner-topcoat-dry color component member and the adhesive-releasable liner member have been assembled.

Additional or alternative apparatus and/or processing steps will be apparent to one skilled in the art in view of this description and are within the scope of the present invention. For example, the color component or adhesive could be applied as a single layer or in multiple layers using a variety of known application techniques including extrusion, spraying, printing, reverse roll, gravure coating, roll application and others known in the art. It is appreciated that the application may provide the sheet with a printed pattern. The layers may have the same properties or various layers, different from each other, may be employed to combine various properties such as color, strength, opacity, and the like. A blocking agent as described above may be applied to the adhesive surface and/or may be mixed with the adhesive. Heating may be provided by infrared, convection, or radiation apparatus or other techniques known in the art.

The color component may incorporate additional components, such as a light diffusing substance, particulates, microparticles, or a rheology-modifying additive of the invention. Texturization may be provided on or in one or more layers of the article to provide a three-dimensional topography by incorporating a stamp or an embossing roller into the manufacture processes described herein. In addition, the manufacturing processes described herein may incorporate a cutting implement for contouring or shaping at least one of the outer peripheral edges of the sheet of dry color component. The manufacturing process may also include a structure for thinning the margins according to the principles of the invention.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. The combination of an article for applying color on a surface applied to an architectural surface, comprising:

(a) an architectural surface;
(b) a first article for applying color on a surface comprising:
   (i) a first sheet of dry color component having two surfaces, opposed side edges, and a side margin along each of said side edges, said first sheet of dry color component comprising an opaque layer of dry paint; and
   (ii) adhesive on one surface of the first sheet of dry color component,
   wherein at least said one of said side margins of said first sheet of dry color component is configured to reduce the visual perceptibility of a seam created when said first article for applying color on a surface is overlapped with a juxtaposed second article for applying color on a surface in that said first sheet of dry color component and said adhesive have a combined thickness of less than about 3.3 mils, and at least said one side margin of said first article for applying color on a surface has an opacity index ranging from about 0.95 to 1.0 and a specular reflectance of less than about 60 gloss units at 60°, and said first article for applying color on a surface is joined by its adhesive to said architectural surface; and
(c) a second article for applying color on a surface:
   (i) a second sheet of dry color component having two surfaces, opposed side edges, and a side margin along each of said side edges, said second sheet of dry color component comprising an opaque layer of dry paint; and
   (ii) adhesive on one surface of the second sheet of dry color component,
   wherein at least said one of said side margins of said second sheet of dry color component is configured to reduce the visual perceptibility of a seam created when said second article for applying color on a surface overlaps said first article for applying color on a surface in that said second sheet of dry color component and said adhesive have a combined thickness of less than about 3.3 mils, and at least said margin of said second sheet of article far applying color on a surface has an opacity index ranging from about 0.95 to 1.0 and a specular reflectance of less than about 60 gloss units at 60°;
wherein said second article for applying color on a surface is joined by its adhesive surface to said architectural surface and to said first article so that one of the edges of said second article for applying color on a surface overlaps an edge of said first article.

2. The combination of claim 1 wherein:
the combination of the first sheet of dry color component and said adhesive in both side margins of said first article have a thickness of less than about 3.3 mils, and both side margins of said first article have an opacity index ranging from about 0.95 to 1.0 and a specular reflectance of less than about 60 gloss units at 60°; and
the combination of the second sheet of dry color component and said adhesive in both side margins of said second article have a thickness of less than about 3.3 mils, and both side margins of said second article have an opacity index ranging from about 0.95 to 1.0 and a specular reflectance of less than about 60 gloss Units at 60°.

3. The combination of claim 1 wherein:
the entire first article has a first sheet of dry color component and adhesive with a combined thickness of less than about 3.3 mils, an opacity index ranging from about 0.95 to 1.0, and a specular reflectance of less than about 60 gloss units at 60°; and
the entire second article has a second sheet of dry color component and adhesive with a combined thickness of less than about 3.3 mils, an opacity index ranging from about 0.95 to 1.0, and a specular reflectance of less than about 60 gloss units at 60°.

4. The combination of claim 1 wherein the portion of said first article containing the edge of said first article that is overlapped by the edge of said second article remains joined to said architectural surface, and the edge of the second article remains overlapped, over the edge of said first article after the completion of installation.

* * * * *

UNITED STATES PATENT AND TRADEMARK OFFICE
CERTIFICATE OF CORRECTION

PATENT NO. : 7,316,832 B2  
APPLICATION NO. : 10/436027  
DATED : January 8, 2008  
INVENTOR(S) : Mark John Steinhardt et al.

Page 1 of 1

It is certified that error appears in the above-identified patent and that said Letters Patent is hereby corrected as shown below:

<u>Column 19</u>

Line 18, delete "glass" and insert --gloss--.

<u>Column 23</u>

Line 42, delete "far" and insert --for--.

Signed and Sealed this

Twenty-seventh Day of May, 2008

JON W. DUDAS  
*Director of the United States Patent and Trademark Office*